United States Patent
Nam et al.

(10) Patent No.: US 10,448,408 B2
(45) Date of Patent: Oct. 15, 2019

(54) METHOD AND APPARATUS FOR COORDINATING MULTI-POINT TRANSMISSION IN ADVANCED WIRELESS SYSTEMS

(71) Applicant: Samsung Electronics Co., Ltd., Suwon-si (KR)

(72) Inventors: Young-Han Nam, Plano, TX (US); Li Guo, Allen, TX (US); Yinan Qi, Surrey (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 15/666,268

(22) Filed: Aug. 1, 2017

(65) Prior Publication Data

US 2018/0042028 A1    Feb. 8, 2018

Related U.S. Application Data

(60) Provisional application No. 62/476,327, filed on Mar. 24, 2017, provisional application No. 62/475,417, (Continued)

(51) Int. Cl.
*H04W 72/08*    (2009.01)
*H04L 5/00*    (2006.01)
(Continued)

(52) U.S. Cl.
CPC .......... *H04W 72/082* (2013.01); *H04B 7/024* (2013.01); *H04B 7/0486* (2013.01);
(Continued)

(58) Field of Classification Search
CPC .... H04B 7/0626; H04B 7/024; H04B 7/0632; H04B 7/0639; H04B 7/0456;
(Continued)

(56) References Cited

U.S. PATENT DOCUMENTS

| 10,148,333 B2 * | 12/2018 | Ji ...................... H04B 7/0626 |
| 2013/0301448 A1 | 11/2013 | Sayana et al. |

(Continued)

FOREIGN PATENT DOCUMENTS

| WO | 2016036097 A1 | 3/2016 |
| WO | 2016056970 A1 | 4/2016 |

OTHER PUBLICATIONS

International Search Report and Written Opinion for International Application No. PCT/KR2017/008456. (9 pages).

(Continued)

*Primary Examiner* — Allahyar Kasraian

(57) ABSTRACT

A method of user equipment (UE) for channel state information (CSI) reporting in a wireless communication system. The method comprises receiving, from a base station (BS), configuration information for the CSI reporting, configuring a plurality of combinations of resources out of a pool of resources, wherein the pool of resources includes two channel state information-reference signals (CSI-RSs) and one channel state information-interference measurement (CSI-IM) based on the configuration information, wherein the two CSI-RSs include CSI-RS1 and CSI-RS2, deriving CSI values from the plurality of combinations of resources, respectively, to generate a CSI report message; and transmitting, to the BS, the CSI report message including the CSI values.

17 Claims, 10 Drawing Sheets

Related U.S. Application Data filed on Mar. 23, 2017, provisional application No. 62/417,721, filed on Nov. 4, 2016, provisional application No. 62/414,388, filed on Oct. 28, 2016, provisional application No. 62/371,118, filed on Aug. 4, 2016.

(51) Int. Cl.
  *H04W 72/04* (2009.01)
  *H04B 7/024* (2017.01)
  *H04B 7/0456* (2017.01)
  *H04B 7/06* (2006.01)

(52) U.S. Cl.
  CPC .......... *H04L 5/0035* (2013.01); *H04L 5/0048* (2013.01); *H04W 72/0413* (2013.01); *H04B 7/0626* (2013.01); *H04W 72/042* (2013.01)

(58) Field of Classification Search
  CPC ..... H04B 17/345; H04B 7/063; H04W 24/10; H04W 72/042; H04W 72/082; H04W 72/0413; H04W 72/085; H04W 72/0446; H04W 72/005; H04W 72/1226; H04W 72/02; H04W 72/044; H04W 72/10; H04W 72/12; H04L 5/0053; H04L 5/0035; H04L 1/0026; H04L 5/0048; H04L 5/0057; H04L 5/0073; H04L 5/1469; H04L 5/001; H04L 5/0007; H04L 5/0094; H04L 5/0023; H04L 5/006
  See application file for complete search history.

(56) References Cited

U.S. PATENT DOCUMENTS

| | | | |
|---|---|---|---|
| 2014/0112173 A1* | 4/2014 | Hammarwall | H04L 1/0026 370/252 |
| 2014/0126402 A1 | 5/2014 | Nam et al. | |
| 2015/0124663 A1* | 5/2015 | Chen | H04L 5/0053 370/278 |
| 2015/0200760 A1* | 7/2015 | Xia | H04L 1/00 370/252 |
| 2016/0105882 A1* | 4/2016 | Park | H04B 7/024 370/329 |
| 2016/0157218 A1 | 6/2016 | Nam et al. | |
| 2016/0212733 A1* | 7/2016 | Davydov | H04B 7/0626 |
| 2016/0301505 A1* | 10/2016 | Furuskog | H04W 72/00 |
| 2018/0212800 A1* | 7/2018 | Park | H04L 1/00 |

OTHER PUBLICATIONS

"ETSI Technical Specification; LTE; Evolved Universal Terrestrial Radio Access (E-UTRA); Physical Channels and Modulation, (3GPP TS 36.211 Version 13.0.0 Release 13)," ETSI TS 136 211, V13.0.0, Jan. 2016, 143 pages.

"ETSI Technical Specification; LTE; Evolved Universal Terrestrial Radio Access (E-UTRA); Multiplexing and Channel Coding, (3GPP TS 36.212 Version 13.0.0 Release 13)," ETSI TS 136 212, V13.0.0, Jan. 2016, 123 pages.

"ETSI Technical Specification; LTE; Evolved Universal Terrestrial Radio Access (E-UTRA); Physical Layer Procedures, (3GPP TS 36.213 Version 13.0.0 Release 13)," ETSI TS 136 213, V13.0.0, May 2016, 328 pages.

"ETSI Technical Specification; LTE; Evolved Universal Terrestrial Radio Access (E-UTRA); Radio Resource Control (RRC) Protocol Specification, (3GPP TS 36.331 Version 13.0.0 Release 13)," ETSI TS 136 331, V13.0.0, Jan. 2016, 670 pages.

Extended European Search Report regarding Application No. 17837292.6, dated Jul. 15, 2019, 8 pages.

Intel Corporation, "Performance evaluation of JT schemes in systems with practical impairments", 3GPP TSG-RAN WG1 #66bis, R1-112914, Oct. 2011, 5 pages.

\* cited by examiner

Rank-3 transmission supported by FIGURE 9

Rank-3 transmission not supported by FIGURE 9

METHOD AND APPARATUS FOR COORDINATING MULTI-POINT TRANSMISSION IN ADVANCED WIRELESS SYSTEMS

CROSS-REFERENCE TO RELATED APPLICATIONS AND CLAIM OF PRIORITY

The present application claims priority to U.S. Provisional Patent Application Ser. No. 62/371,118, filed on Aug. 4, 2016, entitled "Method and Apparatus for Coordinate Multi-point Transmission in Advanced Wireless Systems;" U.S. Provisional Patent Application Ser. No. 62/414,388, filed on Oct. 28, 2016, entitled "Method and Apparatus for Coordinate Multi-point Transmission in Advanced Wireless Systems;" U.S. Provisional Patent Application Ser. No. 62/417,721, filed on Nov. 4, 2016, entitled "Method and Apparatus for Control Signaling for Advanced MIMO Wireless Systems;" U.S. Provisional Patent Application Ser. No. 62/475,417, filed on Mar. 23, 2017, entitled "Method and Apparatus for Coordinate Multi-point Transmission in Advanced Wireless Systems;" and U.S. Provisional Patent Application Ser. No. 62/476,327 filed on Mar. 24, 2017, entitled "Method and Apparatus for Control Signaling for Advanced MIMO Wireless Systems." The content of the above-identified patent documents are incorporated herein by reference.

TECHNICAL FIELD

The present application relates generally to advanced communication systems. More specifically, this disclosure relates to coordinate multi-point transmission in advanced communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for channel state information (CSI) reporting in a wireless communication system is provided. The UE comprises a transceiver configured to receive, from a base station (BS), configuration information for the CSI reporting. The UE further comprises at least one processor configured to configure a plurality of combinations of resources out of a pool of resources, wherein the pool of resources includes two channel state information-reference signals (CSI-RSs) and one channel state information-interference measurement (CSI-IM) based on the configuration information, wherein the two CSI-RSs include CSI-RS1 and CSI-RS2, and derive CSI values from the plurality of combinations of resources, respectively, to generate a CSI report message. The UE comprises the transceiver further configured to transmit, to the BS, the CSI report message including the CSI values.

In another embodiment, the base station (BS) for channel state information (CSI) reporting in a wireless communication system, the BS comprises at least one processor generate configuration information comprising a plurality of combinations of resources out of a pool of resources, wherein the pool of resources includes two channel state information-reference signals (CSI-RSs) and one channel state information-interference measurement (CSI-IM), wherein the two CSI-RSs include CSI-RS1 and CSI-RS2. The BS further comprises a transceiver configured to transmit, to a user equipment (UE), the configuration information for the CSI reporting, and receive, from the UE, a CSI report message including CSI values, wherein the CSI values are derived from the plurality of combinations of resources.

In yet another embodiment, a method of user equipment (UE) for channel state information (CSI) reporting in a wireless communication system is provided. The method comprises receiving, from a base station (BS), configuration information for the CSI reporting, configuring a plurality of combinations of resources out of a pool of resources, wherein the pool of resources includes two channel state information-reference signals (CSI-RSs) and one channel state information-interference measurement (CSI-IM) based on the configuration information, wherein the two CSI-RSs include CSI-RS1 and CSI-RS2, deriving CSI values from the plurality of combinations of resources, respectively, to generate a CSI report message, and transmitting, to the BS, the CSI report message including the CSI values.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation (REF 1);" 3GPP TS 36.212 v13.0.0, "E-UTRA, Multiplexing and Channel coding; (REF 2);" 3GPP TS 36.213 v13.0.0, "E-UTRA, Physical Layer Procedures (REF 3);" and 3GPP TS 36.331 v13.0.0, "Radio Resource Control (RRC) Protocol Specification (REF 4)."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

In the present disclosure, a subframe and slot may mean a TTI (transmission time interval), which implies a duration of a transmission on the radio link. The TTI may include at least one of a PDCCH scheduling a PDSCH, and the PDSCH scheduled by the PDCCH. Alternatively, a subframe may correspond to a time unit, which can be 1 msec or 0.25 msec. A slot comprises a number of consecutive OFDM symbols; for example, a slot comprises 7 or 14 OFDM symbols.

In the present disclosure, CSI-IM implies a zero-power CSI-RS (ZP-CSI-RS) configured to be used for interference measurement.

Figure 1:
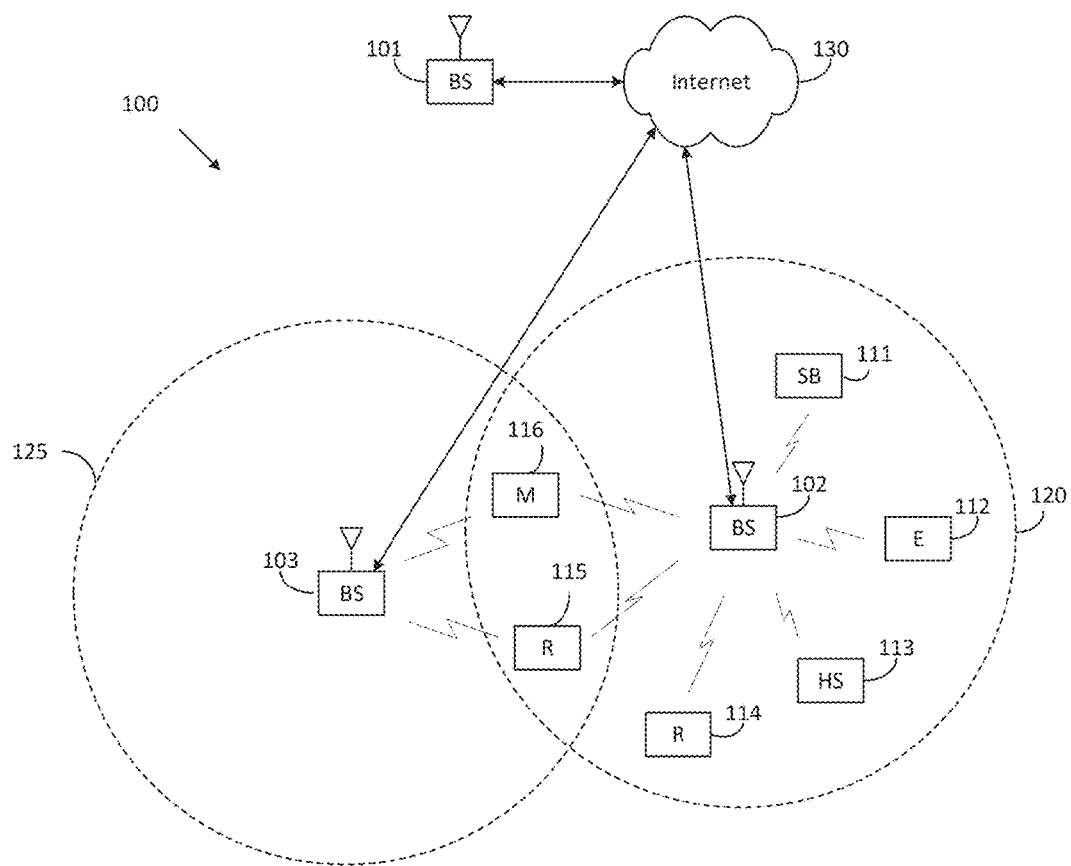
FIG. 1 illustrates an example wireless network according to embodiments of the present disclosure.
Figure 2:
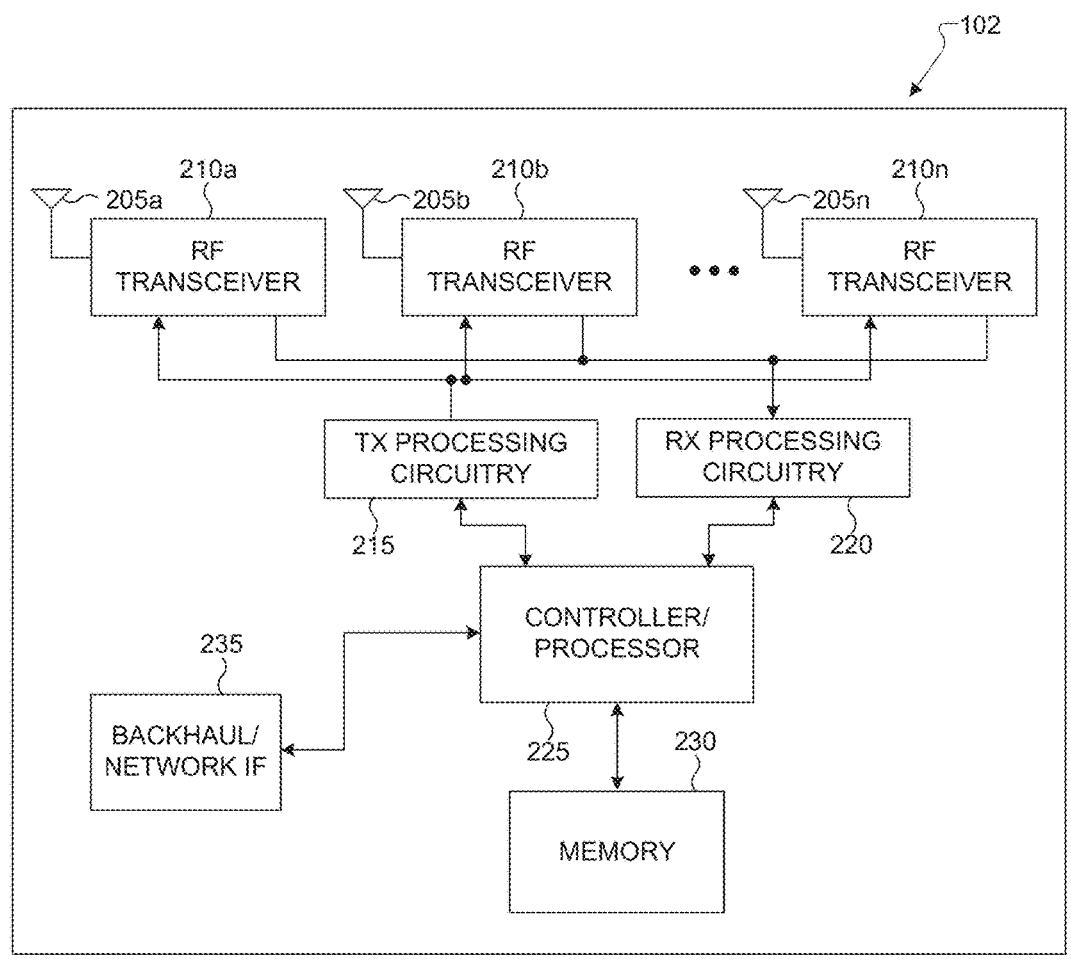
FIG. 2 illustrates an example eNB according to embodiments of the present disclosure.
Figure 3:
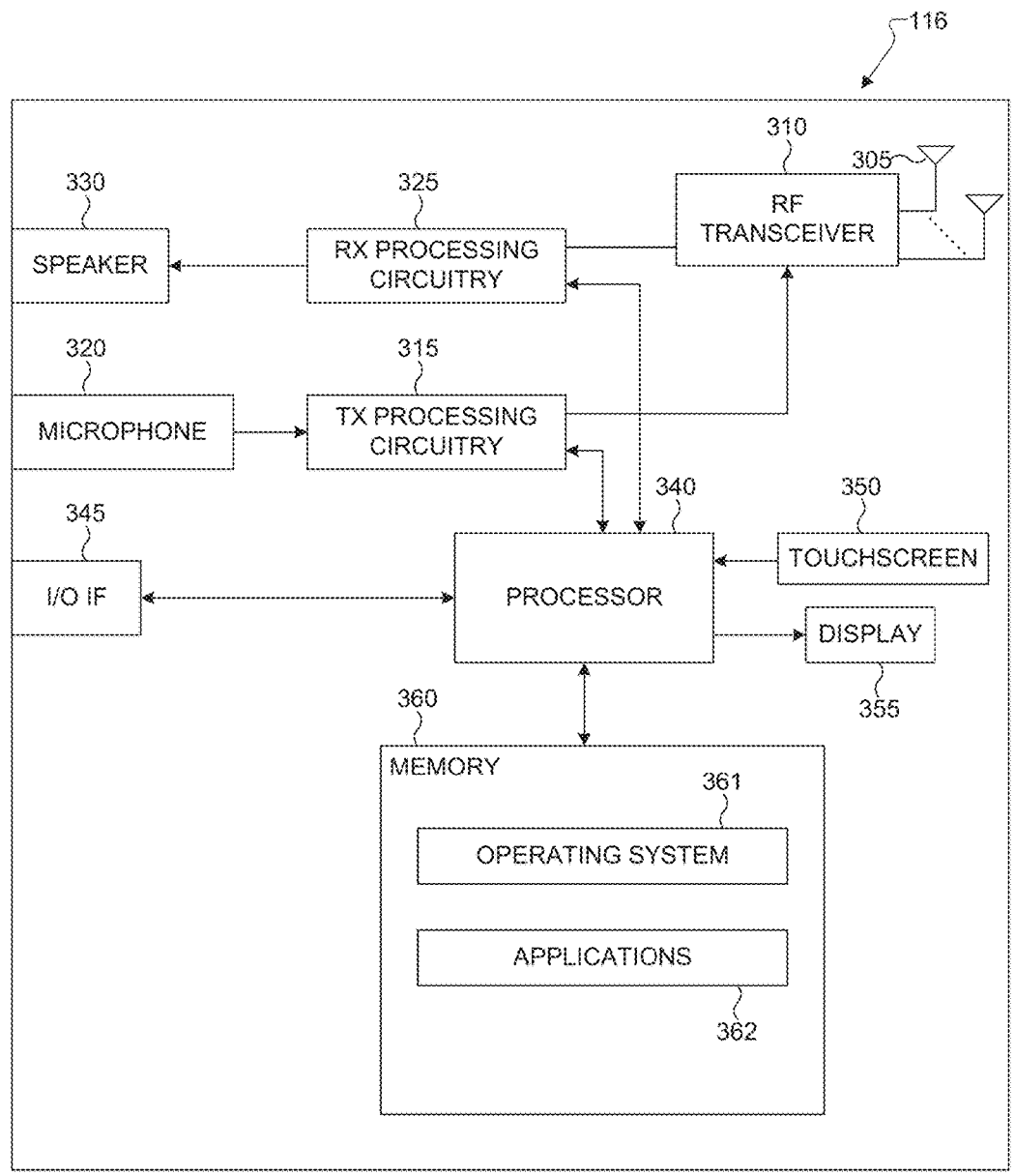
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 100 illustrates an example wireless network according to embodiments of the present disclosure. The embodiment of the wireless network shown in FIG. 1 100 is for illustration only. Other embodiments of the wireless network 100 could be used without departing from the scope of this disclosure.

As shown in FIG. 1 100, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient channel state information (CSI) reporting in an advanced wireless communication system. In certain embodiments, and one or more of the eNBs 101-103 includes circuitry, programming, or a combination thereof, for receiving efficient CSI reporting in an advanced wireless communication system.

Although FIG. 1 100 illustrates one example of a wireless network, various changes may be made to FIG. 1 100. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 200 illustrates an example eNB 102 according to embodiments of the present disclosure. The embodiment of the eNB 102 illustrated in FIG. 2 200 is for illustration only, and the eNBs 101 and 103 of FIG. 1 100 could have the same or similar configuration. However, eNBs come in a wide variety of configurations, and FIG. 2 200 does not limit the scope of this disclosure to any particular implementation of an eNB.

As shown in FIG. 2 200, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceivers 210a-210n are capable of transmitting, to a user equipment (UE), the configuration information for the CSI reporting; and receiving, from the UE, a CSI report message including CSI values, wherein the CSI values are derived with a plurality of combinations of resources.

In such embodiments, the plurality of combinations of resources comprises at least one of a set of the CSI-RS1 and the CSI-IM, a set of the CSI-RS2 and the CSI-IM, or a set of the CSI-RS1, the CSI-RS2, and the CSI-IM.

In some embodiments, the RF transceivers 210a-210n are capable of receiving, from the UE, the CSI report message including one CSI value, and wherein the one CSI value among the CSI values derived from the plurality of combinations of resources.

In such embodiments, the configuration information is configured by at least one of a radio resource control signaling (RRC), a medium access control-control element (MAC-CE), or downlink control information (DCI) received from the BS.

In some embodiments, the RF transceivers 210a-210n are capable of receiving the CSI report message including the CSI values comprising co-phase information, the CSI values being derived based on a set of the CSI-RS1, the CSI-RS2, and the CSI-IM, and an assumption of a coherent transmission if the coherent transmission is indicated, and wherein the CSI values do not include the co-phase information if the coherent transmission is not indicated.

In some embodiments, the RF transceivers 210a-210n are capable of receiving the CSI report message including the CSI values, the CSI values being derived from the plurality of combinations of resources comprising one CSI-RS and two CSI-IMs that include CSI-IM1 and CSI-IM2, and wherein the plurality of combinations of resources includes at least one of a set of the CSI-RS and the CSI-IM1, a set of the CSI-RS and the CSI-IM2, or a set of the CSI-RS, the CSI-IM1, and the CSI-IM2.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beamforming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of generating configuration information comprising a plurality of combinations of resources that includes two channel state information-reference signals (CSI-RSs) and one channel state information-interference measurement (CSI-IM), wherein the two CSI-RSs include CSI-RS1 and CSI-RS2.

In such embodiments, the plurality of combinations of resources comprises at least one of a set of the CSI-RS1 and the CSI-IM, a set of the CSI-RS2 and the CSI-IM, or a set of the CSI-RS1, the CSI-RS2, and the CSI-IM.

In such embodiments, the configuration information is configured by at least one of a radio resource control signaling (RRC), a medium access control-control element (MAC-CE), or downlink control information (DCI) received from the BS.

The memory 230 is coupled to the controller/processor 225. Part of the memory 230 could include a RAM, and another part of the memory 230 could include a Flash memory or other ROM.

Although FIG. 2 200 illustrates one example of eNB 102, various changes may be made to FIG. 2 200. For example, the eNB 102 could include any number of each component shown in FIG. 2 200. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 200 could be combined, further subdivided, or omitted and additional components could be added according to particular needs.

FIG. 3 300 illustrates an example UE 116 according to embodiments of the present disclosure. The embodiment of the UE 116 illustrated in FIG. 3 300 is for illustration only, and the UEs 111-115 of FIG. 1 100 could have the same or similar configuration. However, UEs come in a wide variety of configurations, and FIG. 3 300 does not limit the scope of this disclosure to any particular implementation of a UE.

As shown in FIG. 3 300, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), configuration information for the CSI reporting, and transmitting, to the BS, the CSI report message including the CSI values.

In such embodiments, the plurality of combinations of resources comprises at least one of a set of the CSI-RS1 and the CSI-IM, a set of the CSI-RS2 and the CSI-IM, or a set of the CSI-RS1, the CSI-RS2, and the CSI-IM.

In some embodiments, the RF transceiver 310 is capable of transmitting, to the BS, the CSI report message including the one CSI value.

In such embodiments, the configuration information is configured by at least one of a radio resource control signaling (RRC), a medium access control-control element (MAC-CE), or downlink control information (DCI) received from the BS.

In some embodiments, the RF transceiver 310 is capable of transmitting the CSI report message including the CSI values comprising co-phase information, wherein the CSI values do not include the co-phase information if the coherent transmission is not indicated.

In some embodiments, the RF transceiver 310 is capable of transmitting the CSI report message including the CSI values.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is capable of configuring a plurality of combinations of resources out of a pool of resources, wherein the pool of resources includes two channel state information-reference signals (CSI-RSs) and one channel state information-interference measurement (CSI-IM) based on the configuration information, wherein the two CSI-RSs include CSI-RS1 and CSI-RS2, and deriving CSI values from the plurality of combinations of resources, respectively, to generate a CSI report message.

In such embodiments, the plurality of combinations of resources comprises at least one of a set of the CSI-RS1 and the CSI-IM, a set of the CSI-RS2 and the CSI-IM, or a set of the CSI-RS1, the CSI-RS2, and the CSI-IM.

In some embodiments, the processor 340 is capable of determining one CSI value among the CSI values derived from the plurality of combinations of resources.

In such embodiments, the configuration information is configured by at least one of a radio resource control signaling (RRC), a medium access control-control element (MAC-CE), or downlink control information (DCI) received from the BS.

In some embodiments, the processor 340 is capable of determining a set of the CSI-RS1, the CSI-RS2, and the CSI-IM based on the configuration information, determining whether a coherent transmission is indicated, and deriving, if the coherent transmission is indicated, the CSI values based on the set of the CSI-RS1, the CSI-RS2, and the CSI-IM, and the coherent transmission.

In some embodiments, the processor 340 is capable of configuring, based on the configuration information, the plurality of combinations of resources including one CSI-RS and two CSI-IMs that include CSI-IM1 and CSI-IM2, wherein the plurality of combinations of resources includes at least one of a set of the CSI-RS and the CSI-IM1, a set of the CSI-RS and the CSI-IM2, or a set of the CSI-RS, the CSI-IM1, and the CSI-IM2, and deriving the CSI values from the plurality of combinations of resources, respectively, to generate the CSI report message.

In some embodiments, the processor 340 is capable of determining the plurality of combinations of resources based on information that is configured in the UE, and deriving the CSI values from the plurality of combinations of resources, respectively, to generate the CSI report message.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 300 illustrates one example of UE 116, various changes may be made to FIG. 3 300. For example, various components in FIG. 3 300 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 300 illustrates the UE 116 configured as a mobile telephone or smartphone, UEs could be configured to operate as other types of mobile or stationary devices.

Figure 4A:
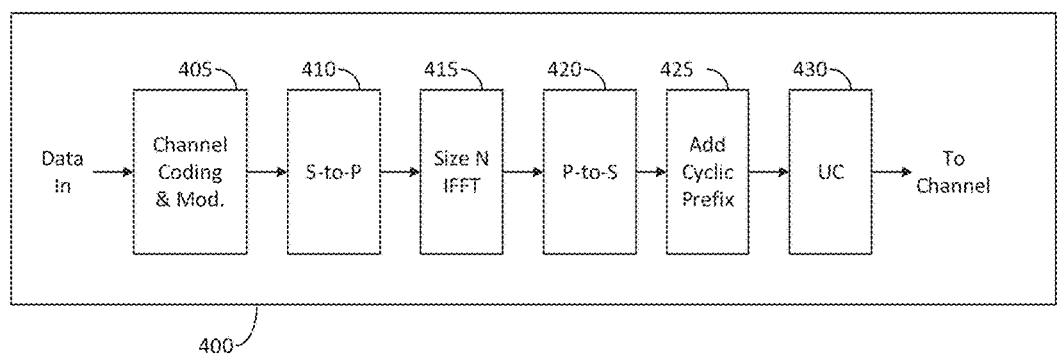
FIG. 4A illustrates a high-level diagram of an orthogonal frequency division multiple access transmit path according to embodiments of the present disclosure.
Figure 4B:
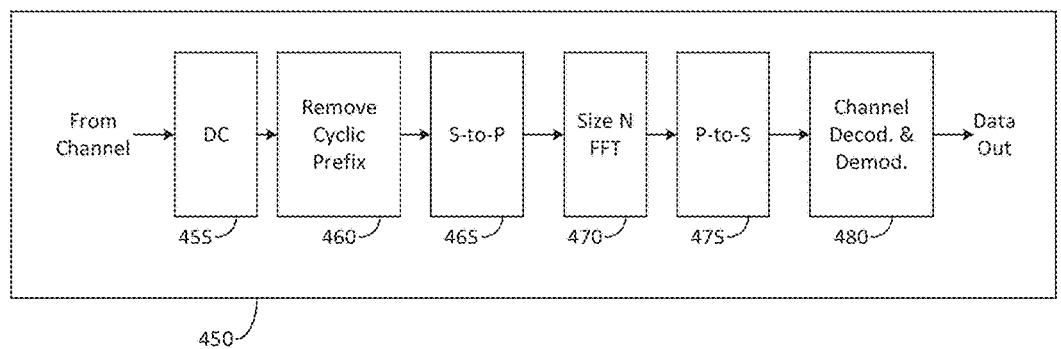
FIG. 4B illustrates a high-level diagram of an orthogonal frequency division multiple access receive path according to embodiments of the present disclosure.

FIG. 4A 400 is a high-level diagram of transmit path circuitry. For example, the transmit path circuitry may be used for an orthogonal frequency division multiple access (OFDMA) communication. FIG. 4B 450 is a high-level diagram of receive path circuitry. For example, the receive path circuitry may be used for an orthogonal frequency division multiple access (OFDMA) communication. In FIGS. 4A 400 and 4B 450, for downlink communication, the transmit path circuitry may be implemented in a base station (eNB) 102 or a relay station, and the receive path circuitry may be implemented in a user equipment (e.g. user equipment 116 of FIG. 1 100). In other examples, for uplink communication, the receive path circuitry 450 may be implemented in a base station (e.g. eNB 102 of FIG. 1 100) or a relay station, and the transmit path circuitry may be implemented in a user equipment (e.g. user equipment 116 of FIG. 1 100).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

The complex-valued modulation symbols for each of the codewords to be transmitted are mapped onto one or several layers. Complex-valued modulation symbols $d^{(q)}(0), \ldots, d^{(q)}(M_{symb}^{(q)}-1)$ for codeword q may be mapped onto the layers $x(i)=[x^{(0)}(i) \ldots x^{(\upsilon-1)}(i)]^T$, $i=0, 1, \ldots, M_{symb}^{layer}-1$ where $\upsilon$ is the number of layers and $M_{symb}^{layer}$ is the number of modulation symbols per layer.

For transmission on a single antenna port, a single layer is used, $\upsilon=1$, and the mapping is defined by TABLE 1.

TABLE 1

Codeword-to-layer mapping for single antenna port transmission

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |

For spatial multiplexing, the layer mapping may be done according to TABLE 2. The number of layers $\upsilon$ is less than or equal to the number of antenna ports P used for transmission of the physical channel. The case of a single codeword mapped to multiple layers is only applicable when the number of cell-specific reference signals is four or when the number of UE-specific reference signals is two or larger.

TABLE 2

Codeword-to-layer mapping for spatial multiplexing

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |

TABLE 2-continued

Codeword-to-layer mapping for spatial multiplexing

| Number of layers | Number of codewords | Codeword-to-layer mapping $i = 0, 1, \ldots, M_{symb}^{layer} - 1$ | |
|---|---|---|---|
| 3 | 1 | $x^{(0)}(i) = d^{(0)}(3i)$ <br> $x^{(1)}(i) = d^{(0)}(3i + 1)$ <br> $x^{(2)}(i) = d^{(0)}(3i + 2)$ | $M_{symb}^{layer} = M_{symb}^{(0)}/3$ |
| 3 | 2 | $x^{(0)}(i) = d^{(0)}(i)$ <br> $x^{(1)}(i) = d^{(1)}(2i)$ <br> $x^{(2)}(i) = d^{(1)}(2i + 1)$ | $M_{symb}^{layer} = M_{symb}^{(0)} = M_{symb}^{(1)}/2$ |
| 4 | 1 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ | $M_{symb}^{layer} = M_{symb}^{(0)}/4$ |
| 4 | 2 | $x^{(0)}(i) = d^{(0)}(2i)$ <br> $x^{(1)}(i) = d^{(0)}(2i + 1)$ <br> $x^{(2)}(i) = d^{(1)}(2i)$ <br> $x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(2i)$ <br> $x^{(1)}(i) = d^{(0)}(2i + 1)$ <br> $x^{(2)}(i) = d^{(1)}(3i)$ <br> $x^{(3)}(i) = d^{(1)}(3i + 1)$ <br> $x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$ <br> $x^{(1)}(i) = d^{(0)}(3i + 1)$ <br> $x^{(2)}(i) = d^{(0)}(3i + 2)$ <br> $x^{(3)}(i) = d^{(1)}(3i)$ <br> $x^{(4)}(i) = d^{(1)}(3i + 1)$ <br> $x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$ <br> $x^{(1)}(i) = d^{(0)}(3i + 1)$ <br> $x^{(2)}(i) = d^{(0)}(3i + 2)$ <br> $x^{(3)}(i) = d^{(1)}(4i)$ <br> $x^{(4)}(i) = d^{(1)}(4i + 1)$ <br> $x^{(5)}(i) = d^{(1)}(4i + 2)$ <br> $x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ <br> $x^{(4)}(i) = d^{(1)}(4i)$ <br> $x^{(5)}(i) = d^{(1)}(4i + 1)$ <br> $x^{(6)}(i) = d^{(1)}(4i + 2)$ <br> $x^{(7)}(i) = d^{(1)}(4i + 3)$ | $M_{symb}^{layer} = M_{symb}^{(0)}/4 = M_{symb}^{(1)}/4$ |

For transmit diversity, the layer mapping may be done according to TABLE 3. There is only one codeword and the number of layers v is equal to the number of antenna ports P used for transmission of the physical channel.

TABLE 3

Codeword-to-layer mapping for transmit diversity

| Number of layers | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ <br> $x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ <br> If $M_{symb}^{(0)} \bmod 4 \neq 0$ two null symbols may be appended to $d^{(0)}(M_{symb}^{(0)} - 1)$ |

For transmission on a single antenna port, precoding is defined by $y^{(p)}(i) = x^{(0)}(i)$ where $p \in \{0,4,5,7,8,11,13\}$ is the number of the single antenna port used for transmission of the layer physical channel and i=0, 1, . . . , $M_{symb}^{ap}-1$, $M_{symb}^{ap} = M_{symb}^{layer}$.

Precoding for spatial multiplexing using antenna ports with UE-specific reference signals is only used in combination with layer mapping for spatial multiplexing as described in LTE specification. Spatial multiplexing using antenna ports with UE-specific reference signals supports up to eight antenna ports and the set of antenna ports used is p=7, 8, . . . , υ+6.

The precoding operation for transmission on v antenna ports is defined by $$\begin{bmatrix} y^{(7)}(i) \\ y^{(8)}(i) \\ \vdots \\ y^{(6+v)}(i) \end{bmatrix} = \begin{bmatrix} x^{(0)}(i) \\ x^{(1)}(i) \\ \vdots \\ x^{(v-1)}(i) \end{bmatrix} \text{ where } i = 0, 1, \ldots, M_{symb}^{ap} - 1, M_{symb}^{ap} = M_{symb}^{layer}.$$

Precoding for transmit diversity is only used in combination with layer mapping for transmit diversity as described in LTE specification. The precoding operation for transmit diversity is defined for two and four antenna ports.

For transmission on two antenna ports, $p \in \{0,1\}$, the output $y(i) = [y^{(0)}(i) \; y^{(1)}(i)]^T$, $i = 0, 1, \ldots, M_{symb}^{ap} - 1$ of the precoding operation is defined by $$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}(x^{(0)}(i)) \\ \mathrm{Re}(x^{(1)}(i)) \\ \mathrm{Im}(x^{(0)}(i)) \\ \mathrm{Im}(x^{(1)}(i)) \end{bmatrix}$$

for $i = 0, 1, \ldots, M_{symb}^{layer} - 1$ with $M_{symb}^{ap} = 2M_{symb}^{layer}$.

In a DCI format 1 for single CW transmission used for the scheduling of one PDSCH CW in one cell, following information is conveyed: resource allocation header (type 0/1); resource block (RB) assignment (e.g., type 0 or 1, both with same payload); modulation coding scheme (MCS): a hybrid automatic repeat request (HARQ) process number; a new data indicator (NDI); a redundancy version (RV); transmit power control (TPC) for physical uplink control channel (PUCCH); a carrier indicator (CA specific, i.e., carrier-aggregation specific); a downlink assignment index (DAI) (time division duplexing (TDD) specific); and an HARQ resource offset (enhanced physical downlink control channel (EPDCCH) specific).

In some embodiments of DCI format 1A for transmit diversity, the DCI format 1A is used for compact scheduling of one PDSCH CW in one cell and RA procedure initiated by a PDCCH order. In such embodiments, the DCI format 1A depends on how the CRC is scrambled and the interpretation of the bit fields can change. In such embodiments, following information is conveyed: flag for format 0/1A differentiation; localized/Distributed VRB assignment flag; resource allocation header (type 0/1); RB assignment (e.g., type 0 or 1, both with same payload); MCS; an HARQ process number; NDI; RV; TPC for PUCCH; SRS request (only in UE-specific search space); a carrier indicator (CA specific); DAI (TDD specific); and an HARQ resource offset (EPDCCH specific).

In some embodiments of DCI format 2D for spatial multiplexing, the DCI format 2D is used for compact scheduling of one PDSCH CW in one cell and RA procedure initiated by a PDCCH order. In such embodiments, the DCI format 2D depends on how the CRC is scrambled and the interpretation of the bit fields can change. In such embodiments, following information is conveyed: a resource allocation header (type 0/1); RB assignment (e.g., type 0 or 1, both with same payload); an HARQ process number; TPC for PUCCH; Antenna ports, SCID and number of layers; PDSCH RE mapping and quasi-colocation (QCL) indicator; SRS request (only in UE-specific search space); a carrier indicator (CA specific); DAI (TDD specific); an HARQ resource offset (EPDCCH specific); and CW. In such embodiments, for each CW, MCS, NDI, and RV are conveyed.

In LTE specifications, TABLE 4 is captured for TM and corresponding DCI configurations.

TABLE 4

| | PDCCH and PDSCH configured by C-RNTI | | |
|---|---|---|---|
| Transmission mode | DCI format | Search Space | Transmission scheme of PDSCH corresponding to PDCCH |
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |

TABLE 4-continued

PDCCH and PDSCH configured by C-RNTI

| Transmission mode | DCI format | Search Space | Transmission scheme of PDSCH corresponding to PDCCH |
|---|---|---|---|
| Mode 6 | DCI format 1A | Common and UE specific by C-RNTI | Transmit diversity |
|  | DCI format 1B | UE specific by C-RNTI | Closed-loop spatial using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity<br>MBSFN subframe: Single-antenna port, port 7 |
|  | DCI format 2C | UE specific by C-RNTI | Up to 8 layer transmission, ports 7-14 or single-antenna port, port 7, 8, 11, or 13 if UE is configured with higher layer parameter dmrs-tableAlt, single-antenna port, port 7 or 8 otherwise |
| Mode 10 | DCI format 1A | Common and UE specific by C-RNTI | Non-MBSFN subframe: If the number of PBCH antenna ports is one, Single-antenna port, port 0 is used, otherwise Transmit diversity<br>MBSFN subframe: Single-antenna port, port 7 |
|  | DCI format 2D | UE specific by C-RNTI | Up to 8 layer transmission, ports 7-14 or single-antenna port, port 7, 8, 11, or 13 if UE is configured with higher layer parameter dmrs-tableAlt, single-antenna port, port 7 or 8 otherwise |

The IE CSI-Process is the CSI process configuration that E-UTRAN may configure on a serving frequency:

```
CSI-Process-r11 ::=    SEQUENCE {
  csi-ProcessId-r11          CSI-ProcessId-r11,
  csi-RS-ConfigNZPId-r11     CSI-RS-ConfigNZPId-r11,
  csi-IM-ConfigId-r11        CSI-IM-ConfigId-r11,
  p-C-AndCBSRList-r11        P-C-AndCBSR-Pair-r13a,
  cqi-ReportBothProc-r11 CQI-ReportBothProc-r11  OPTIONAL, -- Need OR
  cqi-ReportPeriodicProcId-r11   INTEGER (0..maxCQI-ProcExt-r11) OPTIONAL, -- Need OR
  cqi-ReportAperiodicProc-r11    CQI-ReportAperiodicProc-r11 OPTIONAL,    -- Need OR ...,
[[ alternativeCodebookEnabledFor4TXProc-r12 ENUMERATED {true}OPTIONAL, -- Need ON
  csi-IM-ConfigIdList-r12        CHOICE {
        release         NULL,
        setup           SEQUENCE (SIZE (1..2)) OF CSI-IM-ConfigId-r12
  }                     OPTIONAL, -- Need ON
     cqi-ReportAperiodicProc2-r12     CHOICE {
        release         NULL,
        setup           CQI-ReportAperiodicProc-r11
     }                  OPTIONAL   -- Need ON
]],
[[   cqi-ReportAperiodicProc-v1310      CHOICE {
        release         NULL,
        setup           CQI-ReportAperiodicProc-v1310
     }                  OPTIONAL,     -- Need ON
     cqi-ReportAperiodicProc2-v1310    CHOICE {
        release         NULL,
        setup           CQI-ReportAperiodicProc-v1310
```

```
          }                        OPTIONAL,        -- Need ON
       eMIMO-Type-r13              CSI-RS-ConfigEMIMO-r13 OPTIONAL
    -- Need ON
       ]]
}
```

| CSI-Process field descriptions |
| --- |
| alternativeCodebookEnabledFor4TXProc |
| Indicates whether code book in TS 36.213 [23] Table 7.2.4-0A to Table 7.2.4-0D is being used for deriving CSI feedback and reporting for a CSI process. EUTRAN may configure the field only if the number of CSI-RS ports for non-zero power transmission CSI-RS configuration is 4. |
| cqi-ReportAperiodicProc |
| If csi-MeasSubframeSets-r12 is configured for the same frequency as the CSI process, cqi-ReportAperiodicProc applies for CSI subframe set 1. If csi-MeasSubframeSet1-r10 or csi-MeasSubframeSet2-r10 are configured for the same frequency as the CSI process, cqi-ReportAperiodicProc applies for CSI subframe set 1 or CSI subframe set 2. Otherwise, cqi-ReportAperiodicProc applies for all subframes. E-UTRAN configures cqi-ReportAperiodicProc-v1310 only if cqi-ReportAperiodicProc-r11 is configured |
| cqi-ReportAperiodicProc2 |
| cqi-ReportAperiodicProc2 is configured only if csi-MeasSubframeSets-r12 is configured for the same frequency as the CSI process. cqi-ReportAperiodicProc2 is for CSI subframe set 2. E-UTRAN shall set cqi-ReportModeAperiodic-r11 in cqi-ReportAperiodicProc2 the same as in cqi-ReportAperiodicProc. E-UTRAN configures cqi-ReportAperiodicProc2-v1310 only if cqi-ReportAperiodicProc2-r12 is configured. |
| cqi-ReportBothProc |
| Includes CQI configuration parameters applicable for both aperiodic and periodic CSI reporting, for which CSI process specific values may be configured. E-UTRAN configures the field if and only if cqi-ReportPeriodicProcId is included and/or if cqi-ReportAperiodicProc is included. |
| cqi-ReportPeriodicProcId |
| Refers to a periodic CQI reporting configuration that is configured for the same frequency as the CSI process. Value 0 refers to the set of parameters defined by the REL-10 CQI reporting configuration fields, while the other values refer to the additional configurations E-UTRAN assigns by CQI-ReportPeriodicProcExt-r11 (and as covered by CQI-ReportPeriodicProcExtId). |
| csi-IM-ConfigId |
| Refers to a CSI-IM configuration that is configured for the same frequency as the CSI process. |
| csi-IM-ConfigIdList |
| Refers to one or two CSI-IM configurations that are configured for the same frequency as the CSI process. csi-IM-ConfigIdList can include 2 entries only if csi-MeasSubframeSets-r12 is configured for the same frequency as the CSI process. UE shall ignore csi-IM-ConfigId-r11 if csi-IM-ConfigIdList-r12 is configured. |
| csi-RS-ConfigNZPId |
| Refers to a CSI RS configuration using non-zero power transmission that is configured for the same frequency as the CSI process. |
| eMIMO-Type |
| Parameter: eMIMO-Type, see TS 36.213 [23], TS 36.211 [21]. If eMIMO-Type is set to nonPrecoded, the codebooks used for deriving CSI feedback are in TS 36.213 [23, Table 7.2.4-10 to Table 7.2.4-17]. Choice values nonPrecoded and beamformed correspond to 'CLASS A' and 'CLASS B' respectively, see TS 36.212 [22] and TS 36.213 [23]. |

| -continued |
| --- |
| CSI-Process field descriptions |
| p-C-AndCBSRList |
| The UE shall ignore p-C-AndCBSRList-r11 if configured with eMIMO-Type unless it is set to beamformed, alternative CodebookEnabledBeamformed is set to FALSE and csi-RS-ConfigNZPIdListExt is not configured, |

NC-JT refers to a transmission technique which involves $N_{TPs} > 1$ TPs, wherein each of $N_{TPs}$ TPs transmit independent data streams to a UE configured with NC-JT reception.

Figure 5:
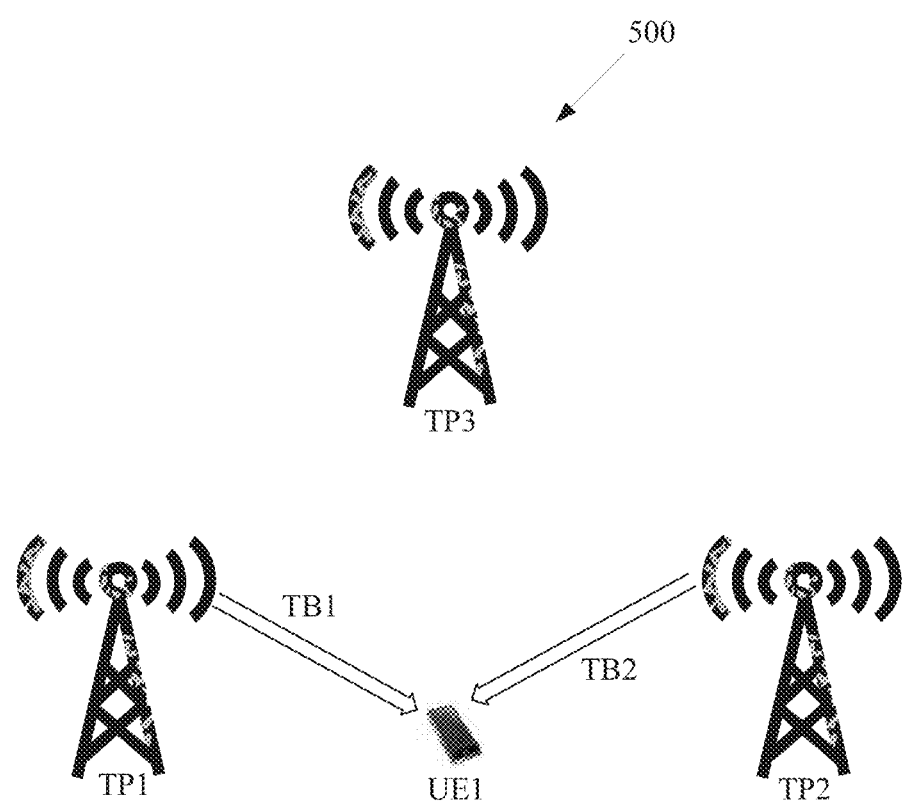
FIG. 5 illustrates a non-coherent joint transmission (NC-JT) according to embodiments of the present disclosure.

FIG. 5 illustrates a non-coherent joint transmission (NC-JT) 500 according to embodiments of the present disclosure. The embodiment of the non-coherent joint transmission (NC-JT) illustrated in FIG. 5 500 is for illustration only, and the non-coherent joint transmission (NC-JT) 500 of FIG. 5 500 could have the same or similar configuration. However, FIG. 5 500 does not limit the scope of this disclosure to any particular implementation of the non-coherent joint transmission (NC-JT).

FIG. 5 illustrates NC-JT transmissions according to some embodiments of the present disclosure. UE1 is configured with non-coherent JT reception with an NC-JT measurement set comprising TP1, TP2 and TP3. UE1 receives TB1 and TB2 respectively from a TP pair comprising TP1 and TP2, wherein the TP pair is selected from the NC-JT measurement set. In these embodiments, the UE is allowed to process up to $N_{TBs}$ DCIs (PDCCHs) to receive up to $N_{TBs}$ TBs conveyed in $N_{TBS}$ PDSCHs in a subframe, wherein each PDSCH carries only a single TB.

The single TB is mapped to a single CW, which is in turn mapped to up to $N_L$ layers, utilizing the CW-to-layer mapping defined in TABLE 5, in which a single CW is mapped to up to 4 layers.

TABLE 5

Codeword-to-layer mapping for spatial multiplexing

| Number of layers | Number of codewords | Codeword-to-layer mapping $i = 0, 1, \ldots, M_{symb}^{layer} - 1$ | |
| --- | --- | --- | --- |
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |

The UE may be configured with a number, $N_{TBs}$, which may correspond to either the maximum number of PDCCHs to decode, or the maximum number of TBs in each subframe/TTI, or both. In such instance, the UE may be configured to monitor at least $N_{TB}$ CORESETs (control resource sets) to receive up to $N_{TB}$ number of PDSCHs/TBs, one CORESET per PDSCH/TB. The number, $N_{TBS}$, can be either a constant in the standards specification, or configured in the higher layer (e.g., example values include 1, 2, 3, 4). Note that TABLE 5 can also be used when the maximum number of layers is two—the first two rows (corresponding to number of layers being 1 and 2) can be used in that case.

For facilitating UE's demodulating the $N_{TBS}$ PDSCHs from the $N_{TBs}$ TPs, $N_{TBs}$ sets of orthogonal DMRS need to be configured. One example to achieve this purpose is to partition the available DMRS ports into $N_{TB}$ sets, G1, . . . , $G_{NTB}$'s, and indicate to the UE which set of DMRS each of the $N_{TB}$ DCIs indicates.

In the below DMRS port group description, DMRS ports A, B, C and D in DMRS port group {A, B, C, D} are respectively used for L0(layer 0), L1, L2, L3 of the corresponding PDSCH.

In one embodiment, $N_{TBs}$=2 and LTE specification DMRS ports 7-14 are partitioned into two groups. One example of the group partition is G1={7, 8, 9, 10}, G2={11, 12, 13, 14}. Another example of the group partition is G1={7, 8, 11, 13} and G2={9, 10, 12, 14}, in which case the DMRS REs corresponding to the two groups are orthogonal.

Still another examples are: G1={7, 9, 11, 12} and G2={8, 10, 13, 14}, and G1={7, 9, 11, 13} and G2={8, 10, 12, 14}. If only a single port is allocated (by DCI(s)) per each group in a TTI, i.e., when DMRS ports 7 and 8 are indicated, the PDSCH rate matching is around one DMRS CDM group; and the power ratio between DMRS and PDSCH on a given antenna port is 0 dB. If more than one port is allocated by (DCI(s)) for at least one group in a TTI, the PDSCH rate matching is around the two DMRS CDM groups; and the power ratio between DMRS and PDSCH on a given antenna port is 3 dB (DMRS power is 3 dB bigger). Still other examples are: G1={7, 8, 9, 10}, G2={11, 13, 12, 14}, of which design allows using only a single CDM group up to two layers per port group.

In another embodiment, $N_{TBS}$=2 and DMRS ports 7-10 are partitioned into two groups. One example of the group partition is G1={7, 8}, G2=19, 101. In another example, G1={7, 9} and G2={8, 10}, of which design may be useful to save DMRS overhead when a single layer is scheduled per DMRS port group. In another example, G1={7,8}, and G2={11,13}, of which design consumes only one CDM group for all the supported ranks, and is the best in terms of DMRS overhead.

In yet another embodiment, NTBs=4 and DMRS ports 7-14 are partitioned into two groups. One example of the group partition is G1={7, 8}, G2={9, 10}, G3={11, 13}, G4={12, 14}.

The DMRS partition information can be configured in the higher layer. DMRS ports comprising each group may explicitly be indicated. Alternatively, multiple candidate DMRS port partition methods are pre-defined among some of those methods disclosed above, and one of the method is indicated. In one such embodiment, if a UE is configured in the higher layer with a transmission scheme (up to 2-TB transmission scheme), say, TS X, the UE may expect at least one of the following. Note that the following is described with an assumption of up to 2-TB transmissions for simplicity, but the same principles can apply to up to $N_{TB}$-TB transmissions for any positive integer of $N_{TB}$.

The UE can be further higher-layer configured with CSI-RS/BRS resources that are paired with the configured DMRS groups. For example, a first CSI-RS/BRS resource is configured for a first DMRS group; a second CSI-RS/BRS resource is configured for a second DMRS group; and so on.

The CSI-RS/BRS resources can be used for indication of QCL relation with the indicated DMRS ports in a DCI scheduling PDSCH.

The UE can receive up to two (=$N_{TB}$) DCIs of a same format scheduling a PDSCH for one subframe for NC-JT. The two DCIs are of a same format, say DCI format X, except that "Antenna ports, scrambling identity and number of layers" is differently interpreted in the two DCI formats.

In one example, a first one-bit (=$\log_2(N_{TB})$) information is configured to the UE so that the UE can identify the corresponding DMRS partition to interpret "antenna ports, scrambling identity and number of layers" as shown below.

| Bit state 0 | DMRS group $G_1$ |
| Bit state 1 | DMRS group $G_2$ |

In one example, the first one-bit information is conveyed by one bit field of the DCI. In another example, the first one-bit information is jointly coded with other information.

In yet another example, the first one-bit information is conveyed by C-RNTI, for which the UE is also configured with two separate C-RNTIs for the two DCIs in the higher-layer.

In yet another example, the first one-bit information is conveyed by the time-frequency location (or a logical resource index) of the PDCCH carrying the DCI format X, for which the UE is also configured in the higher layer with group partition information of time-frequency locations (or logical resource indices)—e.g., information on IDs belonging to a first group and IDs belonging to a second group. If the UE receives the DCI on a time-frequency resource (or a logical resource index) belonging to a first group, then the UE identifies that the bit state is 0, according to TABLE 1; If the UE receives the DCI on a time-frequency resource (or a logical resource index) belonging to a second group, then the UE identifies that the bit state is 1, according to TABLE 1.

In one example, the first group of logical indices comprises a smaller half of total number of logical resource indices; the second group of logical indices comprises a larger half of total number of logical resource indices. In other words, the first group comprises 1, . . . , N/2; and the second group comprises N/2+1, . . . , N, wherein N is the total number of logical resource indices.

In some embodiments, a set of time-frequency resources that are configured to carry PDCCH is called CORESET, and a UE may be configured with a number of CORESETs. For example, the UE can be configured with two CORESETs, which are respectively associated with the two partition groups of the DMRS. The first one-bit information (can be generated according to TABLE 1) is conveyed by the identity of the CORESET on which the PDCCH is transmitted. When the UE receives a PDCCH scheduling a PDSCH in a first CORESET, the UE is configured to assume the bit state 0 for the scheduled PDSCH; and when the UE receives a PDCCH scheduling a PDCCH scheduling a PDSCH in a second CORESET, the UE is configured to assume the bit state 0 for the scheduled PDSCH.

When the UE is also configured with paired CSI-RS/BRS resources for each DMRS group, the bit state to indicate the DMRS group also indicates the paired CSI-RS/BRS resource for the UE to assume QCL with the indicated DMRS ports in a set of large scale parameters. It is noted that in a CSI-RS/BRS resource may alternatively referred to a beam pair link (BPL).

The CW-to-layer mapping for a PDSCH scheduled by each of the two DCIs is performed based on TABLE 5.

The precoding for each CW is performed differently depending on the DMRS group (can be indicated by the one bit information). In one example, when $G_1=\{7, 8, 9, 10\}$, $G_2=\{11, 12, 13, 14\}$, the precoding is performed according to TABLE 6, differently dependent upon the DMRS group and the number of layers.

TABLE 6

Precoding

| Number of layers | DMRS group $G_1$ | DMRS group $G_2$ |
| --- | --- | --- |
| 1 | $[y^{(7)}(i)] = [x^{(0)}(i)]$ | $[y^{(9)}(i)] = [x^{(0)}(i)]$ |
| 2 | $\begin{bmatrix} y^{(7)}(i) \\ y^{(8)}(i) \end{bmatrix} = \begin{bmatrix} x^{(0)}(i) \\ x^{(1)}(i) \end{bmatrix}$ | $\begin{bmatrix} y^{(9)}(i) \\ y^{(10)}(i) \end{bmatrix} = \begin{bmatrix} x^{(0)}(i) \\ x^{(1)}(i) \end{bmatrix}$ |
| 3 | $\begin{bmatrix} y^{(7)}(i) \\ y^{(8)}(i) \\ y^{(11)}(i) \end{bmatrix} = \begin{bmatrix} x^{(0)}(i) \\ x^{(1)}(i) \\ x^{(2)}(i) \end{bmatrix}$ | $\begin{bmatrix} y^{(9)}(i) \\ y^{(10)}(i) \\ y^{(12)}(i) \end{bmatrix} = \begin{bmatrix} x^{(0)}(i) \\ x^{(1)}(i) \\ x^{(2)}(i) \end{bmatrix}$ |
| 4 | $\begin{bmatrix} y^{(7)}(i) \\ y^{(8)}(i) \\ y^{(11)}(i) \\ y^{(13)}(i) \end{bmatrix} = \begin{bmatrix} x^{(0)}(i) \\ x^{(1)}(i) \\ x^{(2)}(i) \\ x^{(3)}(i) \end{bmatrix}$ | $\begin{bmatrix} y^{(9)}(i) \\ y^{(10)}(i) \\ y^{(12)}(i) \\ y^{(14)}(i) \end{bmatrix} = \begin{bmatrix} x^{(0)}(i) \\ x^{(1)}(i) \\ x^{(2)}(i) \\ x^{(3)}(i) \end{bmatrix}$ |

In such embodiments, "antenna ports, scrambling identity and number of layers" of DCI format X is interpreted differently, e.g., according to either TABLE 7 or TABLE 8, depending on the first one-bit information from the DCI format X. For example, suppose that a UE is configured with TS X, and the UE receives two DCIs of format X in a subframe. The UE respectively decodes bit state 1 and 0 of the first one-bit information from a first DCI and a second DCI. Then, The UE assumes that "antenna ports, scrambling identity and number of layers" are indicated by TABLE 7 for a first PDSCH scheduled by the first DCI; and by TABLE 8 for a second PDSCH scheduled by the second DCI. The tables below are for illustration purpose only, and other tables can be constructed with other DMRS port grouping methods without departing from the principles of this disclosure.

TABLE 7

Antenna port(s), scrambling identity and number of layers indication for DMRS ports {7, 8, 11, 13}

| Value | Message (Alt 1) | Message (Alt 2) |
| --- | --- | --- |
| 0 | 1 layer, port 7, $n_{SCID} = 0$ | 1 layer, port 7, $n_{SCID} = 0$ |
| 1 | 1 layer, port 7, $n_{SCID} = 1$ | 1 layer, port 7, $n_{SCID} = 1$ |
| 2 | 1 layer, port 8, $n_{SCID} = 0$ | 1 layer, port 8, $n_{SCID} = 0$ |
| 3 | 1 layer, port 8, $n_{SCID} = 1$ | 1 layer, port 8, $n_{SCID} = 1$ |
| 4 | 2 layers, ports 7-8 | 2 layers, ports 7-8, $n_{SCID} = 0$ |
| 5 | 3 layers, ports 7-8,11 | 2 layers, ports 7-8, $n_{SCID} = 1$ |
| 6 | 4 layers, ports 7-8,11,13 | 3 layers, ports 7-8,11 |
| 7 | Reserved | 4 layers, ports 7-8,11,13 |

TABLE 8

Antenna port(s), scrambling identity and number of layers indication for DMRS ports {9, 10, 12, 14}

| Value | Message (Alt 1) | Message (Alt 2) |
| --- | --- | --- |
| 0 | 1 layer, port 9, $n_{SCID} = 0$ | 1 layer, port 9, $n_{SCID} = 0$ |
| 1 | 1 layer, port 9, $n_{SCID} = 1$ | 1 layer, port 9, $n_{SCID} = 1$ |
| 2 | 1 layer, port 10, $n_{SCID} = 0$ | 1 layer, port 10, $n_{SCID} = 0$ |
| 3 | 1 layer, port 10, $n_{SCID} = 1$ | 1 layer, port 10, $n_{SCID} = 1$ |
| 4 | 2 layers, ports 9-10 | 2 layers, ports 9-10, $n_{SCID} = 0$ |
| 5 | 3 layers, ports 9-10,12 | 2 layers, ports 9-10, $n_{SCID} = 1$ |
| 6 | 4 layers, ports 9-10,12,14 | 3 layers, ports 9-10,12 |
| 7 | Reserved | 4 layers, ports 9-10,12,14 |

In some embodiments, the first one-bit information indicates other information as well as the DMRS partition group information: TB (or CW) index: 1, 2, 3, . . . (0, 1, 2, . . . ); HARQ process group index; bit position on HARQ-ACK information bits; mapping of HARQ-ACK bits corresponding to the scheduled PDSCH onto the indicated HARQ-ACK resource; and CSI reporting contents on a configured CSI reporting resource (can be PUCCH or PUSCH, configured by higher layer: RRC) when aperiodic CSI reporting is triggered.

In some embodiments, some of those information fields above are individually indicated in a DCI, separately from the first one-bit information and other information.

In some embodiments, "a CW/TB index" is used for PDSCH scrambling initialization. In one example, the scrambling initialization value is determined by: $c_{init}=n_{RNTI} \cdot 2^{14}+q \cdot 2^{13}+\lfloor n_s/2 \rfloor \cdot 2^9+N_{ID}^{cell}$, wherein $q \in \{0, 1, 2, \ldots \}$ is a CW index. In another example, the scrambling initialization value is determined by: $c_{init}=n_{RNTI} \cdot 2^{14}+q \cdot 2^{13}+\lfloor n_s/2 \rfloor \cdot 2^9+N_{ID}^{cell}$, wherein $x \in \{0, 1, 2, \ldots \}$ is a CW index, and the values of $n_{ID}^{(x)}$ can be higher-layer configured.

In such embodiments, $n_{RNTI}$ corresponds to the RNTI associated with the PDSCH transmission as described in clause 7.1 3GPP TS 36.213 [3]. In addition, the CW index can also be derived from TB index. In one example, q=(TB index)–1.

In some embodiments, "a HARQ process group index (HPG index)" is used for UE to maintain up to $N_{TBs}$ separate HARQ process groups, each with NHARQ (is equal to e.g., 8) HARQ processes. It is also noted an implementation based solution is possible in which the eNB partition the 8 HARQ process numbers for the $N_{TPs}$ TPs, so that each TP may only use a partition of HARQ process numbers. When this implementation based solution is adopted, the HPG index does not need to be separately signaled.

In some embodiments, "a bit position information on HARQ-ACK information bits" indicates where to place a HARQ-ACK bit, which corresponds to the decoding result of a PDSCH/TB scheduled by a DCI, on a bit sequence to be mapped onto a configured HARQ-ACK resource.

In one example, the UE is configured to encode and report NTP HARQ-ACK bits on a HARQ-ACK resource in a subframe. If the bit position information in a DCI indicates an integer n=0, . . . , NTPs–1, then the n-th bit of the HARQ-ACK bit sequence are used to map the decoding result of the PDSCH scheduled by the DCI.

In another example, the UE is configured to encode and report $K_{NTP}$ HARQ-ACK bits on a HARQ-ACK resource in a subframe. The UE is further configured in the higher layer (RRC) (or alternatively via another bit field in a DCI) a parameter indicating an offset to the HARQ bit position, say, $n_{Offset}=1, 2, \ldots n_{OFFSET, max}$. If the bit position information in a DCI indicates an integer n=0, . . . , $N_{TPs}$–1, then the $(n+n_{Offset})$-th bit of the HARQ-ACK bit sequence are used to map the decoding result of the PDSCH scheduled by the DCI.

In some embodiments, upon receiving a DCI, the UE is configured to receive a PDSCH in a first subframe, and to report HARQ-ACK on an HARQ-ACK resource in a second subframe. Then, the information on mapping of HARQ-ACK bits corresponding to the PDSCH onto the HARQ-ACK resource indicates the HARQ resource to map the HARQ-ACK bits. For this operation, the UE may be additionally configured in the higher-layer (e.g., RRC) with two HARQ-ACK resources: first and second HARQ-ACK resources. If the information corresponds to "state 0," then the UE reports HARQ-ACK on the first resource in the second subframe; if the information corresponds to "state 1," then the UE reports HARQ-ACK on the second resource in the second subframe.

In some embodiments, the information on CSI reporting contents on a configured CSI reporting resource indicates which CSI reporting contents need to be reported on the configured CSI reporting resource. The CSI reporting resource can be either PUCCH or PUSCH, and configured in the higher layer (e.g., RRC). This information can be used in combination with aperiodic CSI reporting trigger on the DCI. When the aperiodic report trigger is off, the information is not used; when it is on, the information is used. If the information corresponds to "state 0," then the UE reports a first CSI report (may be related to a first combination of a CSI-RS and a CSI-IM resource); else if the information corresponds to "state 1," then the UE reports a second CSI report (may be related to a second combination of a CSI-RS and a CSI-IM resource). A new TM whose main TS is TS X for NC-JT can be defined as in TABLE 9.

TABLE 9

An alternative TM definition for NC-JT

| Mode X | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|---|---|---|---|
| | DCI format X | UE specific by C-RNTI | TS X, i.e., up to 2-TB transmissions; UE can receive up to two DCIs |

Suppose that TP1 and TP2 transmit a first and a second PDSCHs to a UE configured with NC-JT on a set of PRBs. Furthermore, the first PDSCH maps to $L_1$ layers, and the second PDSCH maps to $L_2$ layers. When $L_1$ and $L_2$ can be one of 1, 2, 3, 4, all the possible combinations $(L_1, L_2)$ are shown in TABLE 10.

TABLE 10 also shows the total rank information corresponding to each combination, which is equal to L1+L2. For NC-JT transmissions, eNB may need to know the best combination as well as total rank. So in some embodiments, when the UE is configured with NC-JT CSI feedback (or alternatively TS X), the UE is configured to report the index in TABLE 10 to indicate the total rank and (L1, L2) combinations. The indication (Index0) can be treated as RI for channel coding and modulation symbol mapping on PUSCH/PUCCH. The UE can also be explicitly configured in the higher layer to report the index corresponding to rank and (L1, L2) combinations. According to TABLE 10, the index has 16 different states, and hence it can be reported by a 4-bit field on PUSCH/PUCCH.

The possible combinations of (L1, L2) may also include entries with either L1 or L2 is equal to zero. TABLE 11 and TABLE 11A show those entries. In TABLE 11 and TABLE 11A, each of Index0A and Index0B are continued from Index0A/0B in TABLE 10; in addition Index1, Index1A, Index2.1 and Index2.2 are new indices distinct from other indices.

TABLE 11

| Entry with either L1 or L2 | | | | | | | | |
|---|---|---|---|---|---|---|---|---|
| Index1A | 0 | 1 | 2 | 3 | 4 | 5 | 6 | 7 |
| Index0A | 16 | 17 | 18 | 19 | 20 | 21 | 22 | 23 |
| Rank | 1 | 1 | 2 | 2 | 3 | 3 | 4 | 4 |
| $L_1$ | 0 | 1 | 2 | 0 | 3 | 0 | 4 | 0 |
| $L_2$ | 1 | 0 | 0 | 2 | 0 | 3 | 0 | 4 |

TABLE 10

| All the possible combination $(L_1, L_2)$ | | | | | | | | | | | | | | | | |
|---|---|---|---|---|---|---|---|---|---|---|---|---|---|---|---|---|
| Index0/0A/0B | 0 | 1 | 2 | 3 | 4 | 5 | 6 | 7 | 8 | 9 | 10 | 11 | 12 | 13 | 14 | 15 |
| Alt 1 $L_1$ | 1 | 1 | 2 | 2 | 1 | 3 | 2 | 3 | 1 | 4 | 3 | 2 | 4 | 3 | 4 | 4 |
| $L_2$ | 1 | 2 | 1 | 2 | 3 | 1 | 3 | 2 | 4 | 1 | 3 | 4 | 2 | 4 | 3 | 4 |
| Rank | 2 | 3 | 3 | 4 | 4 | 4 | 5 | 5 | 5 | 5 | 6 | 6 | 6 | 7 | 7 | 8 |
| Alt 2 $L_1$ | 1 | 1 | 1 | 1 | 2 | 2 | 2 | 2 | 3 | 3 | 3 | 3 | 4 | 4 | 4 | 4 |
| $L_2$ | 1 | 2 | 3 | 4 | 1 | 2 | 3 | 4 | 1 | 2 | 3 | 4 | 1 | 2 | 3 | 4 |
| Rank | 2 | 3 | 4 | 5 | 3 | 4 | 5 | 6 | 4 | 5 | 6 | 7 | 5 | 6 | 7 | 8 |

TABLE 11A

| Entry with either L1 or L2 | | | | | | | | |
|---|---|---|---|---|---|---|---|---|
| Index1B | 0 | 1 | 2 | 3 | 4 | 5 | 6 | 7 |
| Index0B | 16 | 17 | 18 | 19 | 20 | 21 | 22 | 23 |
| Index2.1 | 0 | 0 | 0 | 0 | 1 | 1 | 1 | 1 |

TABLE 11A-continued

| Entry with either L1 or L2 | | | | | | | | |
|---|---|---|---|---|---|---|---|---|
| Index2.2 | 0 | 1 | 2 | 3 | 0 | 1 | 2 | 3 |
| Rank | 1 | 2 | 3 | 4 | 1 | 2 | 3 | 4 |
| $L_1$ | 1 | 2 | 3 | 4 | 0 | 0 | 0 | 0 |
| $L_2$ | 0 | 0 | 0 | 0 | 1 | 2 | 3 | 4 |

In some embodiments, when the UE is configured with NC-JT CSI feedback (or alternatively TS X), the UE is configured to report the Index0A/0B according to TABLE 10 and TABLE 11/11A to indicate the total rank and (L1, L2) combinations (treated as an RI). The UE can also be explicitly configured in the higher layer to report the index corresponding to rank and (L1, L2) combinations. According to TABLE 10 and TABLE 11/11A, Index 0A/0B has 24 different states, and hence it can be reported by a 5-bit field.

In some embodiments, Index1B reporting is replaced with Index2.1 and Index2.2 reporting. In some embodiments, when the UE is configured with NC-JT CSI feedback (or alternatively TS X), the UE is configured to report either Index0 in TABLE 10 or Index1X (here, X can be A; or alternatively B) in TABLE 11/11A to indicate the total rank and (L1, L2) combinations (in place of RI). How to report a combination of Index0 and Index1X can be configured by either eNB or the UE. At least three combinations can be considered: Index0, Index1X, and both.

In one example of eNB's configuring the UE of the combination information include: a UE is higher-layer configured with a parameter to indicate whether to report Index0 or Index1X or both; and a UE is dynamically indicated in a DCI on PDCCH whether an aperiodic CSI report to include Index0 or Index1X or both. In one example, this information is conveyed on an aperiodic CSI trigger of DCI format 0/4.

In another example, the UE is further configured to report one-bit information to indicate if Index0 or Index1X or both is/are being reported in the current report.

In such embodiments, when the parameter/information indicates Index0, the bit width for Index0 is 4 bits; and when it indicates Index1X, the bit width for Index1X is 3 bits.

In some embodiments, when the UE is configured with NC-JT CSI feedback (or alternatively TS X), the UE is configured to report the Index0 in TABLE 10 (treated as an RI for CSI reporting on PUSCH/PUCCH). In addition to the Index0 and corresponding PMI/CQI reporting, the UE can also be configured to report (1) L1 and the corresponding CQI/PMI with an assumption of L2=0; and (2) L2 and the corresponding CQI/PMI with an assumption of L1=0. For PDSCH reception with NC-JT, the UE can separately estimate channels for $L_1$ and $L_2$ layers for the two PDSCHs, and the UE can perform MIMO demodulation accordingly. However, for joint CSI estimation across the CSI-RS from the two TPs involved with NC-JT, the CW-to-layer mapping method in TABLE 2 is not applicable, as some combinations of ($L_1$, $L_2$) in TABLE 10 are not defined in TABLE 2.

For the CSI feedback purpose, in some embodiments, the UE assumes that $L_1$ and $L_2$ correspond to numbers of layers for CW0 and CW1 in a PDSCH, and also that the CW-to-layer mapping is done according to the following:

$$x^{(0)}(i) = d^{(0)}(L_1, i)$$
$$\ldots \text{ and}$$
$$x^{(L_1-1)}(i) = d^{(0)}(L_1 i + L_1 - 1)$$

$$x^{(L_1)}(i) = d^{(1)} * (L_2 i)$$
$$\ldots \quad , M_{symb}^{layer} = M_{symb}^{(0)}/L_1 = M_{symb}^{(1)}/L_2$$
$$x^{(L_1+L_2-1)}(i) = d^{(1)}(L_2 i + L_2 - 1)$$

The two CQIs for the two CWs are determined according to the CW-to-layer mapping—a first CQI is derived with the $L_1$ layers, and a second CQI is derived with the $L_2$ layers.

For NC-JT CSI estimation for TP1 and TP2, CSI-RS needs to be configured from both TPs. In one embodiment, a UE is configured with a CSI process with two CSI-RS resources: one with $N_{ports}^{CSI}(1)$ CSI-RS ports and the other with $N_{ports}^{CSI}(2)$ CSI-RS ports. For CSI derivation, the UE can assume the following precoding equation:

$$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(\upsilon-1)}(i) \end{bmatrix},$$

wherein $\upsilon = L_1 + L_2$ corresponds to the total rank in TABLE 10 and TABLE 11, and $P = N_{ports}^{CSI}(1) + N_{ports}^{CSI}(2)$ corresponds to sum of the two numbers of CSI-RS ports.

The UE may further assume that the CSI-RS ports of the configured CSI-RS resources are sequentially numbered for CSI derivation purpose: for the first CSI-RS resource: p=p', p'∈{15, 16, . . . , 15+$N_{ports}^{CSI}(1)$−1}; and for the second CSI-RS resource: p=$N_{ports}^{CSI}(1)$+p' where p'∈{15, 16, . . . , 15+$N_{ports}^{CSI}(2)$−1}.

In some embodiments, $$W(i) = \begin{bmatrix} W^{(0)} & 0 \\ 0 & W^{(1)} \end{bmatrix},$$

wherein $W^{(0)}$ corresponds to a $N_{ports}^{CSI}(1)$-port rank-$L_1$ precoder developed according to the LTE specifications, and $W^{(1)}$ corresponds to a $N_{ports}^{CSI}(2)$-port rank-$L_2$ precoder developed according to the LTE specifications. The numbers of columns of $W^{(0)}$ and $W^{(1)}$ are respectively equal to $L_1$ and $L_2$; the number of rows are respectively equal to $N_{ports}^{CSI}(1)$ and $N_{ports}^{CSI}(2)$. Two separate sets of PMIs are reported for $W^{(0)}$ and $W^{(1)}$.

Figure 6:
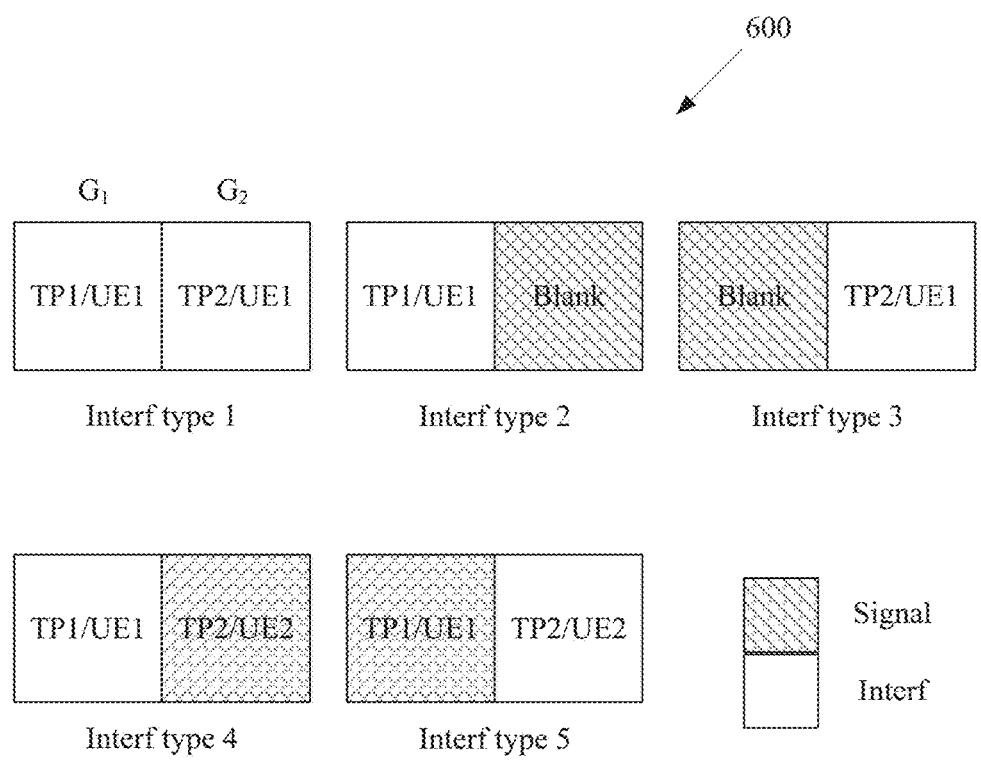
FIG. 6 illustrates different physical resource block (PRB) interference types according to embodiments of the present disclosure.

FIG. 6 illustrates different physical resource block (PRB) interference types 600 according to embodiments of the present disclosure. The embodiment of the different physical resource block (PRB) interference types illustrated in FIG. 6 500 is for illustration only, and the different physical resource block (PRB) interference types of FIG. 6 600 could have the same or similar configuration. However, FIG. 6 600 does not limit the scope of this disclosure to any particular implementation of the different physical resource block (PRB) interference types.

The two PDSCHs transmitted to a UE in the NC-JT manner may partially overlap in the frequency domain. The following different PRB interference types are possible as illustrated in FIG. 6. In FIG. 6, $G_1$ and $G_2$ imply the DMRS groups the two DCIs respectively indicate, which may correspond to two TPs. In one example of PRB interference type 1, two PDSCHs are received from TP1 and TP2. In another example of PRB interference type 2, PDSCH is received only from TP1, with TP2 muted (or blank). In yet another example of PRB interference type 3, PDSCH is received only from TP2, with TP1 muted (or blank). In yet another example of PRB interference type 4, PDSCH is received only from TP1, with TP2 serving another UE. and In yet another example PRB interference type 5, PDSCH is received only from TP2, with TP1 serving another UE The supported numbers of layers and supported MCS on a PDSCH from a certain TP are likely to be different with those different interference types. For example, the number of layers supported on a PDSCH from TP1 with interference type 1 is likely to be less than with interference type 2 thanks to the TP2 muting, in which case no interference is originated from TP2. Hence, the CSI feedback contents will also be determined differently depending on the interference assumptions/types.

In some embodiments, to facilitate CSI estimation for these 5 different interference types, a single CSI process comprising two CSI-RS resources and three CSI-IM resources can be configured: a first CSI-RS resource to estimate the channel part of TP1; a second CSI-RS resource to estimate the channel part of TP2; a first CSI-IM resource to estimate the interference corresponding to interference types 1, 2 and 3; a second CSI-IM resource to estimate the interference corresponding to interference type 4; and a third CSI-IM resource to estimate the interference corresponding to interference type 5.

In some embodiments, when configured with the CSI process and configured to report an aperiodic CSI report, the UE is further configured to report at least one of the following 5 CSI reports corresponding to the 5 different interference types: a first CSI (CQI/PMI/RI) report derived with utilizing both CSI-RS resources and the first CSI-IM according to some embodiments of the present disclosure; a second CSI report derived with utilizing the first CSI-RS resource and the first CSI-IM; a third CSI report derived with utilizing the second CSI-RS resource and the first CSI-IM; a fourth CSI report derived with utilizing the first CSI-RS resource and the second CSI-IM; and a fifth CSI report derived with utilizing the second CSI-RS resource and the third CSI-IM.

A combination of CSI reports to be included in a certain aperiodic CSI report can be indicated by either aperiodic CSI trigger, or configured by higher-layer (e.g., RRC).

In some embodiments, for (PRB) interference types 1, 2 and 3, a first CSI-IM can be configured, which is used to estimate interference from other TPs than TP1 and TP2. For interference types 4 and 5, a second and a third CSI-IM can respectively be configured. The second CSI-IM is used to estimate interference from other TPs than TP1; and the third CSI-IM is used to estimate interference from other TPs than TP2. Hence, for facilitating the CSI estimation for these 5 different interference cases, three CSI process can be configured: a first CSI process comprising two CSI-RS resources and one CSI-IM—for interference types 1, 2 and 3; a second CSI process comprising one CSI-RS resource and one CSI-IM—for interference type 4; and a third CSI process comprising one CSI-RS resource and one CSI-IM—for interference type 5.

In some embodiments of utilizing the first CSI process, the UE is configured to report up to three RI/PMI/CQI reports respectively corresponding to the interference types 1, 2 and 3 in an aperiodic report: RI (Index0 in TABLE 10 . . . corresponding to a first $L_1$ and a first $L_2$ values) derived assuming a joint transmission from the two TPs and corresponding CQI/PMI . . . interference type 1; a second $L_1$ value (can be one of 1, 2, 3, 4:2 bits, treated as an RI) when $L_2$=0 is assumed, and the corresponding CQI/PMI . . . interference type 2; and a second $L_2$ value (can be one of 1, 2, 3, 4:2 bits, treated as an RI) when $L_1$=0 is assumed, and the corresponding CQI/PMI . . . interference type 3.

In one example, each of these second L1 and L2 values is indicated by Index2.2 in TABLE 11A. In another example, these second L1 and L2 values are jointly indicated by Index1B in TABLE 11A.

In some embodiments, utilizing both CSI-RS resources and the CSI-IM resource of the first CSI process, the UE is configured to derive a first L1 value and a first L2 value and its corresponding CQI/PMI (a first CQI/PMI) according to some embodiments of the present disclosure. The UE is further configured to derive a second and a third CQI/PMI with assuming the following: rank of the first $L_1$ value with assuming $L_2$=0, and the corresponding CQI/PMI (denoted as a second CQI/PMI); and rank of the first $L_2$ value with assuming $L_1$=0, and the corresponding CQI/PMI (denoted as a third CQI/PMI).

Then, an aperiodic CSI report contains index0 in TABLE 10 derived with $L_1$ and $L_2$; and also at least one of the following information: the first CQI/PMI . . . for interference type 1; the second CQI/PMI . . . for interference type 2; and the third CQI/PMI . . . for interference type 3.

In some embodiments, the UE is configured to derive $L_1$ and $L_2$ with respectively assuming interference types 4 and 5 and their corresponding CQI/PMI from the second and the third CSI processes: $L_1$ (can be one of 1, 2, 3, 4) derived from the second CSI process, and the corresponding CQI/PMI (denoted as a first CQI/PMI); and $L_2$ (can be one of 1, 2, 3, 4) derived from the third CSI process, and the corresponding CQI/PMI (denoted as a second CQI/PMI)

In one embodiment, the UE is further configured to derive a first CQI/PMI/RI from the second CSI process, and a second CQI/PMI/RI from the third CSI process. Then, the UE is further configured to use the first and the second RIs respectively as L1 and L2 values, in order to derive a third CQI/PMI utilizing the first CSI process with assuming that the two TPs jointly transmit their respective $L_1$ and $L_2$ layers using the NC-JT procedures in some embodiments of the present disclosure. Then, an aperiodic CSI report contains Index0 in TABLE 10 derived with $L_1$ and $L_2$ values and at least one of the following information: the first CQI/PMI . . . for interference type 4; the second CQI/PMI . . . for interference type 5; and the third CQI/PMI . . . for interference type 1.

In some embodiments, the aperiodic reporting trigger (or another bit field) in a DCI indicates which subset of the multiple PMI/CQI needs to be reported.

In some embodiments, a UE is configured with A number of CSI-RS resources, B number of CSI-IM resources, and C CSI processes in an RRC configuration signaling, and the UE is further indicated by DCI or MAC CE signaling of particular combinations of CSI-RS and CSI-IM resources to be used for CSI measurement and reporting for a CSI process in the current and/or future time slots/subframes.

In some embodiments, a UE is configured with A number of NZP CSI-RS resources, B number of CSI-IM resources (i.e., ZP CSI-RS resources configured for interference measurement), and C CSI processes in an RRC configuration signaling, and the UE is further indicated by DCI or MAC CE signaling of particular combinations of CSI-RS and CSI-IM resources to be used for CSI measurement and reporting for a CSI process in the current and/or future time slots/subframes.

A CSI process may alternatively be called "CSI reporting/ measurement setting," and the CSI process or the CSI process configuration describes CSI reporting configurations (e.g., detail parameters for aperiodic/periodic/semi-persistent reporting, subband vs. wideband reporting for each of CQI and PMI, reporting timing information for periodic/semi-persistent reporting—period and offset, eMIMO-Type, etc.).

A CSI process may comprise with a NZP CSI-RS resources and b ZP CSI-RS resources, wherein these CSI-RS resources are from a pool of A NZP CSI-RS resources and B ZP CSI-RS resources. The link between a CSI reporting setting and the CSI-RS resources can be provided by a measurement setting.

A CSI-RS resource may comprise an aggregation of CSI-RS configurations. This case is relevant for constructing a CSI-RS resource with a large number of antenna ports, e.g., for FD-MIMO. For example, a 16-port CSI-RS resource configuration may comprise two 8-port CSI-RS configurations, and the resulting 16-port CSI-RS RE mapping pattern is an aggregation of the two 8-port CSI-RS patterns. CSI-RS RE mapping configurations may also be called "CSI-RS resource." In this context, "CSI-RS resource" may also imply an aggregation of CSI-RS resources to support a large number of antenna ports.

In a first case, a combination of one CSI-RS resource and one CSI-IM resource is further indicated for a CSI process. In this case, the UE is configured to measure signal/channel part of CSI utilizing the one CSI-RS resource, and interference part of the CSI utilizing the one CSI-IM resource; and to report the CSI based on the CSI process.

In a second case, a combination of two CSI-RS resources and one CSI-IM resource is further indicated for a CSI process. In this case, the interference part of the CSI utilizing the one CSI-IM resource. On the other hand, for the signal/channel part, several methods can be devised on how to use these two CSI-RS resources.

In a first method, the UE is making an assumption of CoMP JT transmissions from the TRPs and derives a single CSI report; and to report the CSI based on the CSI process. The UE can also be configured whether to derive CSI based on (1) non-coherent or (2) coherent JT assumptions by RRC signaling, MAC CE signaling or DCI signaling. When configured with non-coherent JT assumption, the UE derives CSI as in the relevant embodiments in the present disclosure. When configured with coherent JT assumption, the UE is configured to aggregate the two CSI-RS resources to construct an aggregated CSI-RS resource with the sum total number of antenna ports from the two CSI-RS resources to derive the CSI, e.g., based on a MIMO codebook configured for the sum total number of antenna ports. Alternatively, the UE may be pre-configured to use either of (1) non-coherent or (2) coherent JT assumption.

In a second method, the UE uses two CSI-RS resources separately to measure/derive two individual CSI reports: a first with measuring the signal part using a first CSI-RS resource and a second with measuring the signal part using a second CSI-RS resource. The UE can be configured to report both CSI reports or one selected CSI report.

In order to specify the UE behavior related to these methods, RRC signaling, MAC CE signaling, or DCI signaling may indicate which method to use for deriving the CSI.

In one example referred to as Option 1, each CSI process related configuration includes an information on which of (1) the first method or (2) the second method needs to be used for CSI derivation for the CSI process. When the first method is indicated, another indication may specify whether non-coherent JT or coherent JT needs to be used for CSI derivation for the CSI process. In one example, the method is indicated in RRC; and the coherent vs. non-coherent JT is indicated in DCI or MAC CE.

In another example referred to as Option 2, each CSI process related configuration includes information on which of (1) the first method; non-coherent JT; (2) the first method; coherent JT; or (3) the second method needs to be used for CSI derivation for the CSI process.

Alternatively, the same setting in each of the Options above is configured for all the configured CSI processes (by RRC signaling).

When the UE is configured to select a CSI to report from a number of CSI reports, the selected CSI report may correspond to the CSI that achieves a higher (or highest) spectral efficiency among all the pairs of (CSI-RS, CSI-IM) that can be generated by the configuration/indication—i.e., the TB size supported by the combination of (rank, CQI) is the highest.

In one embodiment, a combination of one CSI-RS resource and two CSI-IM resources is further indicated for a CSI process. In this case, the UE is configured to measure signal part of CSI utilizing the CSI-RS resource. UE is configured to measure two separate CSIs with using each of the two CSI-IM resources for deriving the interference part; two CSI reports are generated with (the CSI-RS resource, a first CSI-IM resource) and (the CSI-RS resource, a second CSI-IM resource). The UE can be configured to report both CSI reports or one selected CSI report. The principles of those described methods related to (1, 1), (2, 1), (1, 2) combinations of (CSI-RS, CSI-IM) can apply to any (n, m) combinations, n, m=1, 2, 3, . . . .

In some embodiments, the MAC CE signaling configures (CSI-RS, CSI-IM) combinations for the configured CSI processes and a DCI indicates which CSI process is used for measure and report a CSI in the current reporting opportunity. For example, the MAC CE signaling configures: (CSI-RS1, CSI-IM1) for CSI process 1; (CSI-RS1&2, CSI-IM1) for CSI process 2; and (CSI-RS1, CSI-IM1&2) for CSI process 3.

Then the DCI can indicate CSI process(es) that needs to be reported in the next (or the indicated) reporting instance. When CSI process 1 is indicated, the UE is configured to measure and report CSI using (CSI-RS1, CSI-IM1) based on CSI process 1. When CSI process 2 or 3 is indicated, the corresponding UE behavior can be defined similarly according to the MAC CE configurations. The MAC CE can further indicate whether or not individual CSI processes may be used (turned ON/OFF) in the current and future CSI reporting. Suppose that the UE is configured with three CSI processes by RRC, CSI processes 1, 2 and 3. When the UE is further indicated in the MAC CE that CSI process 2 is OFF, the UE may assume that the DCI indicates one of two ON settings, i.e., settings 1 and 3.

A special DCI may be used in place of the MAC CE in the aforementioned embodiments. The transmission opportunities for the special DCI can be separately configured from those DCI scheduling data transmissions, i.e., PDSCH and PUSCH. The payload size and contents in the special DCI are specifically designed for this signaling, and are different from DL assignment and UL grant DCIs.

The DL MIMO in NR systems may be able to support diverse environments, deployment scenarios, and use cases. The time coherence interval and frequency coherent BW varies upon these and the applicable MIMO schemes also vary upon them. For channels with short time coherence interval, CSI cannot be reliably predicted at the transmitter, and hence transmission techniques requiring less prior knowledge of the CSI are more useful; these schemes include OL MIMO and transmit diversity (e.g., space-time or frequency blockcode—SFBC or STBC). For channels with longer time coherence interval, CSI prediction is feasible at the transmitter when CSI feedback and/or channel sounding is available; hence MIMO spatial multiplexing and/or coordinated multipoint (CoMP) transmission techniques can be employed. Therefore, it seems desirable that the NR system supports at least the following transmission techniques: closed-loop/(semi) Open-loop spatial multiplexing; single/Multi-point transmissions; SU/MU-MIMO; transmit diversity (e.g., single/multi panel spatial diversity); and combination of above techniques.

In wireless standards such as LTE specification, a transmission scheme describes how the UE may assume codeword-to-layer mapping and the precoding method for demodulating data symbols. The present disclosure proposes to define the transmission schemes in such a way. A UE can be configured to receive at least one of the following transmission schemes defined in TABLE 12.

TABLE 12

Candidate DL MIMO transmission schemes

| Transmission scheme | CW-to-layer mapping | Precoding | Use cases |
|---|---|---|---|
| TS0: single-antenna port | TABLE 1 | $y^{(P)}(i) = x^{(0)}(i)$ | For supporting low-end users/eNB, mmWave and coverage-limited situations |
| TS0A: single-CW | TABLE 2, single CW entries only | $\begin{bmatrix} y^{(P)}(i) \\ y^{(P+1)}(i) \\ \vdots \\ y^{(P+\upsilon-1)}(i) \end{bmatrix} = \begin{bmatrix} x^{(0)}(i) \\ x^{(1)}(i) \\ \vdots \\ x^{(\upsilon-1)}(i) \end{bmatrix}$ | NC-JT |
| TS1: spatial multiplexing with DMRS | TABLE 2 | $\begin{bmatrix} y^{(P)}(i) \\ y^{(P+1)}(i) \\ \vdots \\ y^{(P+\upsilon-1)}(i) \end{bmatrix} = \begin{bmatrix} x^{(0)}(i) \\ x^{(1)}(i) \\ \vdots \\ x^{(\upsilon-1)}(i) \end{bmatrix}$ | CL MIMO, OL MIMO (PRB-level precoder cycling), CoMP/non-CoMP, SU/MU MIMO |
| TS2: transmit diversity | TABLE 3 | $\begin{bmatrix} y^{(P)}(2i) \\ y^{(P+1)}(2i) \\ y^{(P)}(2i+1) \\ y^{(P+1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \operatorname{Re}(x^{(0)}(i)) \\ \operatorname{Re}(x^{(1)}(i)) \\ \operatorname{Im}(x^{(0)}(i)) \\ \operatorname{Im}(x^{(1)}(i)) \end{bmatrix},$ for 2-Tx diversity | High-Doppler (small coherence interval) |

TABLE 13

| CSI feedback configuration | | |
|---|---|---|
| Transmission scheme | Configuration of CSI-RS and/or CSI-IM in each CSI process | CQI feedback configuration |
| TS0: single-antenna port | Only a CSI-RS resource | For a single CW |
| TS0A: single CW | Two CSI-RS resources and a CSI-IM resource | Up to two CWs |
| TS1: transmit diversity | Only a CSI-RS resource | For a single CW |
| TS2: spatial multiplexing with DMRS | A CSI-RS resource and a CSI-IM resource | For up to two CWs |

As the CSI-process based configurations can cope with various transmissions schemes including all the TS in A CSI feedback is essential for eNB's implementing these DL MIMO transmission techniques. A CSI-process based CSI feedback configuration is adopted in LTE specification, for supporting CoMP transmissions. For configuring the UE to report CSI on N TRPs, N CSI processes can be configured, wherein N=1, 2, 3, . . . . Each CSI process configuration includes a CSI-RS resource for channel estimation and/or a CSI-IM for interference estimation along with other configuration details. The CSI process configurations can be defined differently dependent upon the configured TS. One example is shown in TABLE 13. Note that a CSI-RS resource may comprise multiple (K) component CSI-RS resources for CSI-RS resource aggregation as in Class A and Class B CSI reporting configurations in 3GPP LTE specification release 13.

TABLE 13, the CSI-process based configuration can be adopted as a baseline CSI feedback configuration.

In the LTE specifications, it was customary to define a DCI format per transmission scheme. If the same principle is followed, three different DCI formats (of potentially different payload and signaling contents) can be defined for TS0, TS0A, TS1 and TS2 defined in TABLE 8. The DCI formats for TS0, TS0A, TS1 and TS2 are denoted as DCI formats NR0, NR0A, NR1 and NR2. DCI format NR0 can be analogous to DCI format 1, DCI format NR0A and NR2 to DCI format 2C/2D; and DCI format NR1 to DCI format 1A.

Alternatively, a single DCI format can be defined, which comprises a union of all the information bits required for the all the DL MIMO transmission schemes. When the UE is configured with a specific TS, the UE is configured to treat some information bits not used for the specific TS as "reserved." This approach, however, may introduce control coverage issues especially when a large payload has to be supported for the single DCI format. Hence it is preferred to define separate DCI formats for the separate TS.

In the LTE specifications, a pair of TS (a normal TS and a fallback TS) is supported in a configured TM. If the same principle is followed, at least three different TMs can be defined for the different use cases according to TABLE 14, with utilizing the TS defined in TABLE 13.

TABLE 14

Candidate DL MIMO transmission modes

| Transmission modes | Supported TSs and DCI formats | Use cases |
|---|---|---|
| TM0 | TS0 (SIMO) and DCI format NR0 | a default TM; Initial PDSCH reception; coverage limited users |
| TM1 | TS1 (TxD) and DCI format NR1 | High Doppler; coverage limited users |
| TM2 | TS1 (TxD) and DCI format NR1 as fallback; TS2 (MIMO SM) and DCI format NR2 as normal | Low Doppler; medium to high SINR |
| TM3 | TS1 (TxD) and DCI format NR1 as fallback; TS0A (MIMO SM) and DCI format NR0A as normal. UE is expected to process up to two in a subframe, scheduled by two DCIs of format NR0A | High interference |

Alternatively, an eNB can explicitly configure a list of the supported TSs and/or a list of DCI formats for each UE in a higher-layer signaling, instead of implicitly signaling these information via a TM configuration.

In some embodiments, the list of DCI formats can be configured per RNTI (or UE-ID) type. For example, the UE is configured with a first list of DCI formats for a first RNTI type; with a second list of DCI formats for a second RNTI type; and so on.

In some embodiments, the list of DCI formats may include duplicated DCI formats. In one example, the configured DCI format list is {NR1, NR0A, NR0A}. This configuration is useful for supporting non-coherent JT.

In some embodiments, the list of DCI formats may include pairs of (DCI format, maximum number of the DCI format need to be decoded in a subframe). In one example, the configured DCI format list is {(NR1, 1), (NR0A, 2)}. In such example, the UE is configured to decode up to one DCI format NR1 (because the number is configured to be 1); and up to two DCI format NR0A (because the number is configured to be 2).

A CSI process comprises multiple NZP CSI-RS resources and multiple ZP CSI-RS resources. An N number of combinations of NZP CSI-RS resources and ZP CSI-RS resources are pre-defined or configured, wherein each combination can be used for generating a CSI report for the configured CSI process. One such combination may involve more than one, say n, NZP CSI-RS resource and one ZP CSI-RS resource. When UE is indicated to generate and report a CSI report for this combination, the UE assumes a CoMP JT transmission on an aggregation of the NZP CSI-RS ports from the multiple NZP CSI-RS resources to derive a CSI report.

The CSI report may comprise n number of sub-reports, wherein each sub-report can comprise at least one of PMI/CQI/RI. The codebook to be used for the CoMP JT hypothesis corresponding to this combination will be generated differently dependent upon the n numbers of antenna ports corresponding to the n number of CSI-RS resources, and also upon the CoMP transmission hypothesis, i.e., whether it is coherent JT or non-coherent JT. If it is coherent JT, a co-phase parameter may also be reported. If it is non-coherent JT, co-phase parameter is absent in the report. The configuration contents of this combination may include "transmission type," which may be either "coherent JT" or "non-coherent JT."

A simple aperiodic CSI trigger may be introduced, so that one state of the trigger indicates the UE to report all N CSI reports. Alternatively, an aperiodic CSI trigger may indicate UE what reports to report out of these N reports in the scheduled PUSCH. Alternatively, UE may be allowed to select m out of N reports to be reported in the scheduled PUSCH. Among the m reports to be reported, one report may be fixed to be the one corresponding to CoMP JT, i.e., a combination of multiple (e.g., 2) NZP CSI-RS resources and one ZP CSI-RS resource.

A UE can be configured with a CSI process (or a CSI reporting/measurement setting) that comprises with a NZP CSI-RS resources and b ZP CSI-RS resources (CSI-IM resources), wherein both a and b are a positive integer.

A UE may be pre-configured or further configured with N possible combinations of CSI-RS resource(s) and CSI-IM resource(s) that can be considered with the configured CSI process.

In one example, when a CSI process comprises a=2 NZP CSI-RS resources and b=3 CSI-IM resources, the UE is pre-configured with the N=5 such combinations listed below: combination 1: both NZP CSI-RS resources and a first CSI-IM; combination 2: The first NZP CSI-RS resource and the first CSI-IM; combination 3: The second NZP CSI-RS resource and the first CSI-IM; combination 4: The first NZP CSI-RS resource and a second CSI-IM; and combination 5: The second NZP CSI-RS resource and a third CSI-IM. These five combinations correspond to the five different signal and interference hypotheses (or network coordination methods) illustrated in FIG. 6.

For a combination involves more than one NZP CSI-RS resources, such as combination 1, a UE may additionally be configured with an information whether to report an inter-TP/panel co-phase information or not (or alternatively whether to assume coherent JT or non-coherent JT). Depending on the information, the UE may select a different codebook, i.e., with and without inter-TP/panel co-phase.

In another example, when a CSI process comprises a=2 NZP CSI-RS resources and b=1 CSI-IM resources, the UE is pre-configured with the N=3 such combinations, i.e., Combinations 1, 2 and 3 shown above. These three combinations correspond to the first three different signal and interference hypotheses (or network coordination methods) illustrated in FIG. 6. In yet another example, the UE is configured in the RRC/MAC with information on how these N combinations comprise. For each combination, UE is informed with identity of the NZP CSI-RS resource(s) and identity of ZP CSI-RS resource(s).

In particular, the CSI report for the combination involving more than one NZP CSI-RS resources is generated as in the following. An aggregation of the 2 (this number is for example) NZP CSI-RS resources and a first CSI-IM are used for the CSI derivation, wherein the UE may apply the block-diagonal codebook on the aggregated ports. For the reporting purposes, two sets of CQI/PMI/RI generated. The first set corresponds to PMI/CQI/RI of a first NZP CSI-RS resource; and the second set corresponds to PMI/CQI/RI of a second NZP CSI-RS resource. Each of the two sets of CQI/PMI/RI includes at least one of CQI, PMI and RI.

The block-diagonal codebook has a different structure, dependent upon whether the inter-TP/panel co-phase (or coherent JT) is configured or not. In case the inter-TP/panel co-phase is not configured, it has the following form:

$$W(i) = \begin{bmatrix} W^{(0)} & 0 \\ 0 & W^{(1)} \end{bmatrix}.$$

In case the inter-TP/panel co-phase is configured, it has the following form:

$$W(i) = \begin{bmatrix} W^{(0)} & 0 \\ 0 & e^{j\phi}W^{(1)} \end{bmatrix},$$

Here, $e^{j\phi}$ corresponds to the inter-TP/panel co-phase, and a quantized value of $e^{j\phi}$ may also be reported.

Precoding matrix W(i) is derived using the aggregation of the two NZP CSI-RS resources. According to the block diagonal codebook structure, precoding matrix $W^{(0)}$ is applied only to the antenna ports corresponding to the first NZP CSI-RS resource; and precoding matrix $W^{(1)}$ is applied only to the antenna ports corresponding to the second NZP CSI-RS resource.

The first set of PMI/CQI/RI refers to PMI/RI corresponding to $W^{(0)}$, and resulting channel quality, i.e., CQI assuming that a first MIMO codeword (or transport block) of a PDSCH is mapped to RI number of layers corresponding to $W^{(0)}$.

Similarly, the second set of PMI/CQI/RI refers to PMI/RI corresponding to $W^{(1)}$, and resulting channel quality, i.e., CQI assuming that a second MIMO codeword (or transport block) of the PDSCH is mapped to RI number of layers corresponding to $W^{(1)}$. Alternatively, UE is configured to report a single set of PMI/CQI/RI with assuming the block diagonal codebook, wherein the minimum value of RI for UE to report is configured to be two, when the two NZP CSI-RS resources are configured and NC-JT is indicated by the network. Alternatively, UE is configured to report two PMIs, and a single set of CQI/RI with assuming the block diagonal codebook, wherein the minimum value of RI for UE to report is configured to be two, when the two NZP CSI-RS resources are configured and NC-JT is indicated by the network, and the two PMIs correspond to $W^{(0)}$ and $W^{(1)}$.

The same codeword to layer mapping method as the one used for reporting two sets of PMI/CQI/RI is applicable to these alternative methods as well, i.e., $W^{(0)}$ corresponds to layers of CW0, and $W^{(1)}$ corresponds to layers of CW1. In this case, a pair of the numbers of layers (or numbers of columns) for $W^{(0)}$ and $W^{(1)}$ (this corresponds to the ranks for the two CW s) is selected from: {(1,1), (2,1), (2,2), (3,2), (3,3), (4,3), (4,4)}.

In one embodiment, when an aperiodic CSI is triggered, a UE reports all the N different CSI reports corresponding to the N combinations of the CSI process on the scheduled PUSCH. When this method is used, the network can obtain full CSI on all the possible interference hypotheses that are necessary for dynamic switching of NC-JT, DPS and single-TP operation. However, the feedback size is large. In order to allow the network to be able to control the feedback overhead, network configuration can be introduced.

In one embodiment, the networks dynamically trigger which combination of report need to be reported on the scheduled PUSCH. In one example, an N-bit bitmap may comprise the CSI trigger for NC-JT, and when an n-th bit is set, the UE may report CSI report n. In another example, the UE may be configured with a list of subsets of CSI reports to be reported, corresponding to different states of the CSI triggering field. Each CSI report is to be generated with a combination of an aggregation of NZP CSI-RS resources and a CSI-IM. In such a case, the higher layer configuration may include a list of combination IDs for each CSI trigger field state. An example table is constructed in TABLE 15. The subsets in TABLE 15 can be configured in RRC layer; or alternatively in the MAC layer.

TABLE 15

| Subset configured in RRC layer | |
| --- | --- |
| State of the CSI trigger field | UE behavior on CSI reporting |
| 0 | No CSI reported |
| 1 | A first subset of CSI reports configured in the higher layer |
| 2 | A second subset of CSI reports configured in the higher layer |
| ... | ... |

In yet another method, the UE may be configured with a list of subsets of CSI reports to be reported. However, the reports in these subsets could be correlated and therefore some reports in certain subsets may be compressed. For example, if the first subset contains the reports corresponding to combinations 1, 2 and 3 and another subset contains the reports corresponding to combinations 4 and 5, the reports of these two subsets are correlated and this correlation can be explained as follows. For hypothesis 2, the interference is from other TPs, denoted as $I_{other}$ and for hypothesis 4, the interference is from other TPs and TP2, denoted as $I_2+I_{other}$. Considering CQI feedback as an example, the UE may report full CQI value for hypothesis 2 and a "differential" CQI value for hypothesis 4 based on the identified correlation between two hypothesis. Therefore, the feedback bits for the second subset can be reduced by exploring such correlation.

In order for the network to obtain only necessary UE feedback, the specification may allow UE selection of a subset of hypotheses. In one example, the aperiodic CSI trigger may indicate that the UE select and report up to n reports for the scheduled PUSCH, and the UE reports both the identity (identities) of the selected reports and CQI/PMI/RI contents, e.g., in terms of IDs for the combinations. In particular, the UE may be further configured to include at least report 1 (corresponding to NC-JT), and UE is allowed to select the remaining n−1 reports out of the total number of hypotheses. Moreover, the correlation between two reports can be explored by the UE to reduce the feedback signaling overhead.

All combinations identified above can be configured in RRC message in the DCI triggering bits. For the subband and wideband configuration of the CQI/PMI, all the N reports may be configured to be in the same way, i.e., either subband or wideband. Alternatively, the first report (corresponding to NC-JT) may be configured to be always wideband, regardless of the related SB/WB configuration; and the other N−1 reports are generated according to the related SB/WB configurations.

In these UE selection cases, the network can understand the UE preference on the network transmission configurations, which can be used for the network scheduling and link adaptation afterwards. In another example, it is assumed that a CSI process is configured with a=2 and b=1. In this case UE can derive CSI of any of the three different signal and interference hypotheses corresponding to CSI reports 1, 2 and 3. The methods in the current embodiment apply for this CSI process as well.

Once the UE calculates the CSI based on the configuration of the CSI process, it needs to report to the coordinating TPs. In one method, the UE reports up to N reports (based on TP configuration or UE selection) only to one TP and the reports will then be shared by all the TPs via the X2 interface. The TP receives CSI reports can either be the one that transmits PDCCH or the one with strongest link with the UE, which, in TDD, can be identified via the identified multiple interference hypotheses. In another method, the UE reports up to N reports to all coordinating TPs and therefore sharing via X2 interface is no longer needed. In yet another method, the UE reports separately to the coordinating TPs, i.e., the UE reports two different subsets of up to N reports to two TPs, respectively.

For the case where a central controller can make scheduling decisions for NC-JT involving multiple TRPs, one DCI based scheduling indication method can be feasible.

In the 1-DCI case, semi-static DMRS partition may not be necessary, but UE still needs to know which DMRS ports are from which TRPs, to make proper QCL assumptions.

In one embodiment, semi-static DMRS group partition is higher-layer configured as in the aforementioned embodiments, and a new DMRS mapping table is provided, so that semi-static DMRS partition is taken into account for UE to be indicated with two separate subsets of DMRS ports from semi-statically partitioned DMRS port groups. In this case CW-to-layer mapping as in the aforementioned embodiments can be used.

In one embodiment, the DL assignment DCI indicates one of the following three states: (TP/TB/CW 1 on, TP/TB/CW 2 off), (TP/TB/CW 1 off, TP/TB/CW 2 on), (TP/TB/CW 1 on, TP/TB/CW 2 on); and also two sets of antenna port indication fields which are respectively provided for TP/TB/CW 1 and TP/TB/CW 2. The PQI may also be provided separately for each antenna port indication field. One example of the two sets of antenna ports indication fields can be found in TABLE 7 and 8.

When (TP/TB/CW 1 on, TP/TB/CW 2 off) is indicated, the UE is configured to receive one TB/CW from TP1 on DMRS ports indicated by a first antenna port indication field. A first CSI-RS/BRS resource configured for the first DMRS port group can be assumed to be QCL in the set of large scale parameters with the DMRS ports in the current subframe.

When (TP/TB/CW 1 off, TP/TB/CW 2 on) is indicated, the UE is configured to receive one TB/CW from TP2 on DMRS ports indicated by a second antenna port indication field. A second CSI-RS/BRS resource configured for the second DMRS port group can be assumed to be QCL in the set of large scale parameters with the DMRS ports in the current subframe.

When (TP/TB/CW 1 on, TP/TB/CW 2 on) is indicated, the UE is configured to receive two TBs/CWs from TP1 and TP2 on DMRS ports indicated by both the first and the second antenna port indication fields. The first CSI-RS/BRS resource configured for the first DMRS port group can be assumed to be QCL with the DMRS ports indicated by the first antenna port indication fields; and the second CSI-RS/ BRS resource configured for the second DMRS port group can be assumed to be QCL with the DMRS ports indicated by the second antenna port indication fields, in the set of large scale parameters with the DMRS ports in the current subframe.

When semi-static DMRS partition is not applied, UE may be able to identify whether or not to partition the indicated DMRS ports into two based on the DCI. When the UE is indicated not to partition the indicated DMRS ports, the UE may also be indicated what a CSI-RS/BRS resource is QCL with the indicated DMRS ports in the set of large scale parameters. When the UE is indicated to partition the indicated DMRS ports into two groups, the UE may be indicated with: (1) a first CSI-RS/BRS resource that are QCL with a first group of DMRS ports; and (2) a second CSI-RS/BRS resource that are QCL with a second group of DMRS ports. In one method, the DMRS port partition can be done according to the CW partition. The DMRS ports corresponding to a first CW belong to a first DMRS port group; the DMRS ports corresponding to a second CW belong to a second DMRS port group. A PQI may be provided per CW in this case. In one alternative, two separate sets of RRC configured parameters may be provided for the PQIs for the two CWs. In another alternative, a single set of RRC configured parameters is provided for the PQI for both CWs.

A UE can be configured in the higher-layer with two CSI-RS/BRS resources, each of which may be QCL with a subset of DMRS ports in PDSCH reception.

In one embodiment, when a DCI indicates the UE to receive one CW, the same DCI further indicates either of the following two states to indicate which CSI-RS is QCL in the set of large scale parameters: (1) a first CSI-RS/BRS resource; and (2) a second CSI-RS/BRS resource. When the DCI indicates the UE to receive two CWs, the same DCI further indicates the UE how the two CSI-RS/BRS resources are QCL-related to the two CWs. For this purpose, the DCI indicates either of the following two states: (1) (CW0, CW1) is QCL-related to (a first, a second) CSI-RS/BRS; and (2) (CW0, CW1) is QCL related to (the second, the first) CSI-RS/BRS. The QCL relation of DMRS and CSI-RS/BRS is in a set of large scale parameters. Here, the first and/or the second CSI-RS/BRS is/are selected from the higher-layer configured CSI-RS/BRS resources.

In another embodiment, the DCI indicates either of the following two states: (1) one CSI-RS/BRS resource is QCL with all the DMRS ports; (2) two CSI-RS/BRS resources are QCL with the two groups of DMRS ports. Here, (1) can be indicated regardless of whether UE is indicated to receive one or two CWs; however (2) can be indicated only when the UE is indicated to receive two CWs. When (1) is indicated, the DCI can further indicate either of the following two states to indicate which CSI-RS is QCL in the set of large scale parameters: (1-1) a first CSI-RS/BRS resource; and (1-2) a second CSI-RS/BRS resource. When (2) is indicated, the DCI can further indicate either of the following two states: (2-1) (CW0, CW1) is QCL-related to (a first, a second) CSI-RS/BRS; and (2-2) (CW0, CW1) is QCL related to (the second, the first) CSI-RS/BRS. The QCL relation of DMRS and CSI-RS/BRS is in a set of large scale parameters. Here, the first and/or the second CSI-RS/BRS is/are selected from the higher-layer configured CSI-RS/ BRS resources.

Precoding granularity in the frequency domain can be configured to a UE either by DCI or RRC. The UE can be indicated one state out of the following choices: (1) wideband; the UE may assume that a same precoder has been used across the allocated BWs in the TTI; and X-PRB based; the UE may not assume that a same precoder has been used across different group of x-PRBs in the TTI. The value of X can be fixed (e.g., 1 or the same as RBG size or the same as feedback subband size), or configured by RRC.

Precoding granularity in the time domain can also be configured to UE either by DCI or RRC. The UE can be indicated one state out of the following choices: each slot based; across scheduled slots; and a unit of Y-slots; the UE may not assume that a same precoder has been used across different group of x-slots in the TTI. The value of Y can be fixed (e.g., 1 or the same as RBG size), or configured by RRC.

In one embodiment, a DCI indicates precoding granularity in both time and frequency domain jointly. In one such case, the DCI can indicate one of the following states: wideband & across scheduled slots; wideband & a unit of Y slots; X-PRB based & across scheduled slots; and X-PRB based & a unit of Y slots.

In another embodiment, a DCI indicates precoding granularity separately for time domain and frequency domain; in one such case two separate one-bit fields are included in the DCI. A first field indicates time-domain granularity and a second field indicates frequency-domain granularity.

In MU interference DMRS channel estimation, if no PRB bundling assumption is specified for interference DMRS ports, the baseline would be that interfering precoders are different across different PRBs, which is likely to result in high complexity and poor performance in interference estimation. If a gNB can configure different PRG sizes to different UEs, UE may not be able to assume that the interference DMRS PRG size is the same as the PRG size configured for the UE's PDSCH. Hence, the PRG size indication for interference estimation may need to be further studied.

The information regarding the precoding granularity (either time or frequency domain or both) is indicated according to the following alternatives: (1) alt 1: the indicated information is applicable only for the indicated DMRS ports; (2) alt 2: the indicated information is applicable for all the DMRS ports in a super-set of DMRS ports. Here, the super-set of DMRS ports may correspond to the set of DMRS ports that can be indicated by the DMRS port indicator field in the DCI; the super set of DMRS ports may be higher-layer (RRC) configured; and (3) alt 3: Separate indication is provided for the indicated DMRS ports and for the interference DMRS ports. The interference DMRS ports correspond to a complement of the set of indicated DMRS ports, wherein the complement is taken towards the super set of DMRS ports.

CSI-RS can be used for beam management or CSI estimation. Two separate CSI-RS can be configured for beam management (B-CSI-RS) and for CSI estimation (A-CSI-RS) for over 6 GHz operations. In addition, two-level CSI-RS can further be considered for A-CSI-RS: one level (level 0) with cell-specific beamforming (coverage-type) and the other (level 1) with UE-specific beamforming (UE-specific-type).

In a B-CSI-RS resource and also for BRS (multi-beam mobility RS), different beamforming is applied on antenna ports and the beamforming on each antenna port varies on the time resources allocated for beam sweeping in relation to hybrid BF. TRP Tx beamforming filters some multi-path components out, and hence delay parameters may become different in different TRP Tx beamforming. On the other hand, it can be assumed that Doppler parameters are invariant with different TRP Tx beamforming, as long as the antenna ports of a B-CSI-RS are from the same TRP.

In a coverage-type A-CSI-RS resource, the same beamforming is applied on antenna ports and the beamforming on each antenna port does not vary over at least within a time unit (e.g., subframe/slot). In such a case, it can be assumed that all the antenna ports within a CSI-RS resource are in QCL in Doppler, delay and Rx beam.

In a UE-specific-type A-CSI-RS resource, different beamforming is applied on each pair of antenna ports, but the beamforming on each antenna port does not vary over at least within a time unit (e.g., subframe/slot). In such a case, it can be assumed that the antenna ports belonging to a pair are QCL in Doppler, delay and Rx beam; but no QCL assumptions can be made between antenna ports belonging to different pairs.

In two antenna ports selected across different CSI-RS resources, a UE may not make any assumptions on QCL, for simplicity.

In summary, the following QCL assumptions may be applied for different types of RS.

Within a B-CSI-RS resource and for BRS, for QCL in Rx beam parameters & delay parameters, no two CSI-RS antenna ports are assumed to be QCL and no two transmissions of a CSI-RS port in different time resources are assumed to be QCL; and for QCL in Doppler parameters, all the CSI-RS antenna ports are assumed to be QCL.

Within a coverage A-CSI-RS resource, all the antenna ports within a CSI-RS resource are in QCL in Doppler, delay and Rx beam.

Within a UE-specific A-CSI-RS resource, two antenna ports belonging to a same dual-pol pair are QCL in Doppler, delay and Rx beam, and two antenna ports belonging to different dual-pol pair are not assumed to be QCL in any of the channel properties.

Across any CSI-RS resources, no two CSI-RS antenna ports selected from two of those configured B-CSI-RS resources are QCL in any of the channel properties.

Figure 7:
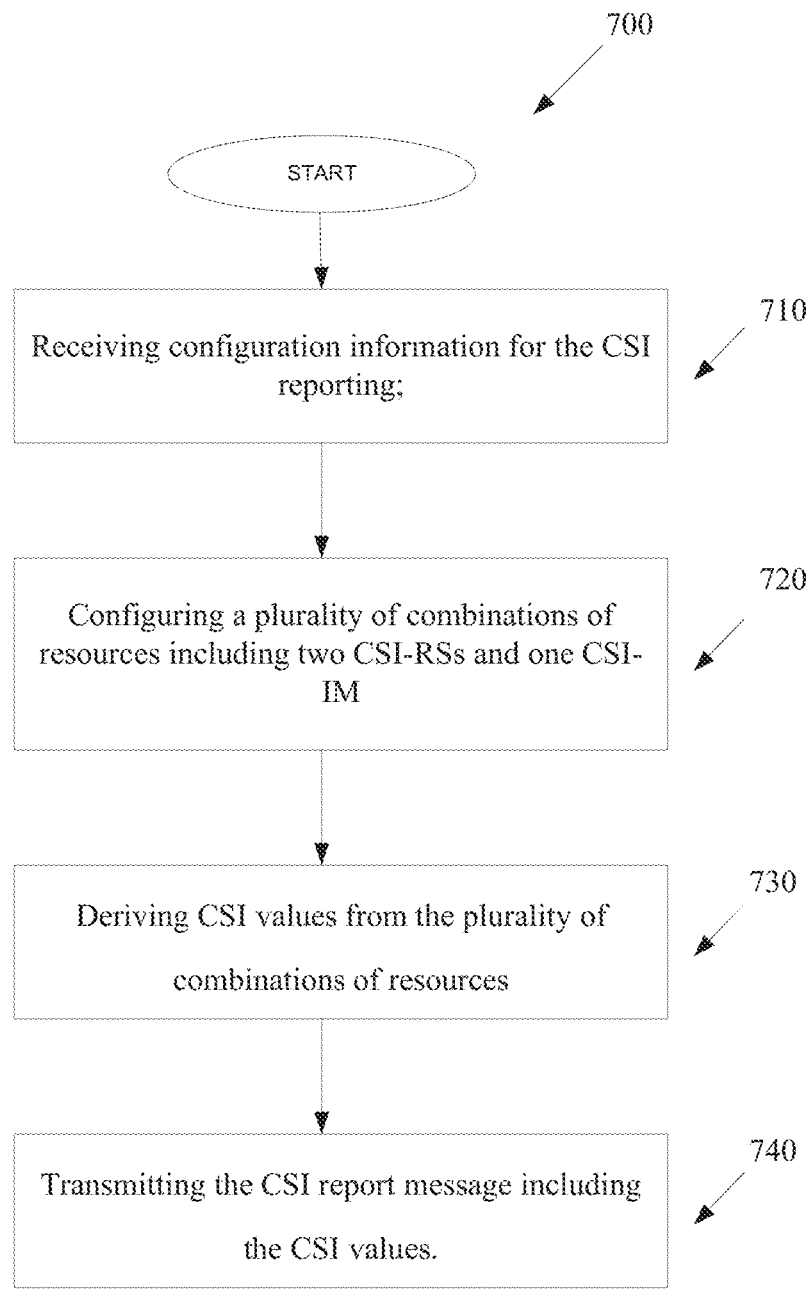
FIG. 7 illustrates a method of user equipment (UE) for coordinate multi-point transmission according to embodiments of the present disclosure.

FIG. 7 illustrates a method of user equipment (UE) for coordinate multi-point transmission according to embodiments of the present disclosure. The embodiment of the method of UE illustrated in FIG. 7 700 is for illustration only, and the method of the UE 700 of FIG. 7 700 could have the same or similar configuration. However, FIG. 7 700 does not limit the scope of this disclosure to any particular implementation of the method of the UE.

The method of the UE as illustrated in FIG. 7 starts at step 710. At step 710, the UE (e.g., 111-116 as illustrated in FIG. 1) receives, from a base station (BS), configuration information for the CSI reporting. In some embodiments, the configuration information is configured by at least one of a radio resource control signaling (RRC), a medium access control-control element (MAC-CE), or downlink control information (DCI) received from the BS.

Next, at step 720, the UE configures a plurality of combinations of resources out of a pool of resources, wherein the pool of resources includes two channel state information-reference signals (CSI-RSs) and one channel state information-interference measurement (CSI-IM) based on the configuration information, In such instance, the two CSI-RSs include CSI-RS1 and CSI-RS2. In some embodiments, the plurality of combinations of resources comprises at least one of a set of the CSI-RS1 and the CSI-IM, a set of the CSI-RS2 and the CSI-IM, or a set of the CSI-RS1, the CSI-RS2, and the CSI-IM. In some embodiments, the UE determines a set of the CSI-RS1, the CSI-RS2, and the CSI-IM based on the configuration information and also determines whether a coherent transmission is indicated. In such embodiments, the UE derives, if the coherent transmission is indicated, the CSI values based on the set of the CSI-RS1, the CSI-RS2, and the CSI-IM, and the coherent transmission. In some embodiments, the UE configures, based on the configuration information, the plurality of combinations of resources including one CSI-RS and two CSI-IMs that include CSI-IM1 and CSI-IM2. In such instance, the plurality of combinations of resources includes at least one of a set of the CSI-RS and the CSI-IM1, a set of the CSI-RS and the CSI-IM2, or a set of the CSI-RS, the CSI-IM1, and the CSI-IM2.

Subsequently, the UE derives, at step 730, CSI values from the plurality of combinations of resources, respectively, to generate a CSI report message. In some embodiments, the UE determines one CSI value among the CSI values derived from the plurality of combinations of resources. In some embodiments, the UE derives the CSI values from the plurality of combinations of resources, respectively, to generate the CSI report message. In some embodiments, the UE determines the plurality of combinations of resources based on information that is configured in the UE and derives the CSI values from the plurality of combinations of resources, respectively, to generate the CSI report message.

Finally, at step 740, the UE transmits, to the BS, the CSI report message including the CSI values. In some embodiments, the UE transmits, to the BS, the CSI report message including one CSI value. In some embodiments, the UE transmits the CSI report message including the CSI values comprising co-phase information. In such instance, the CSI values do not include the co-phase information if the coherent transmission is not indicated.

Figure 8:
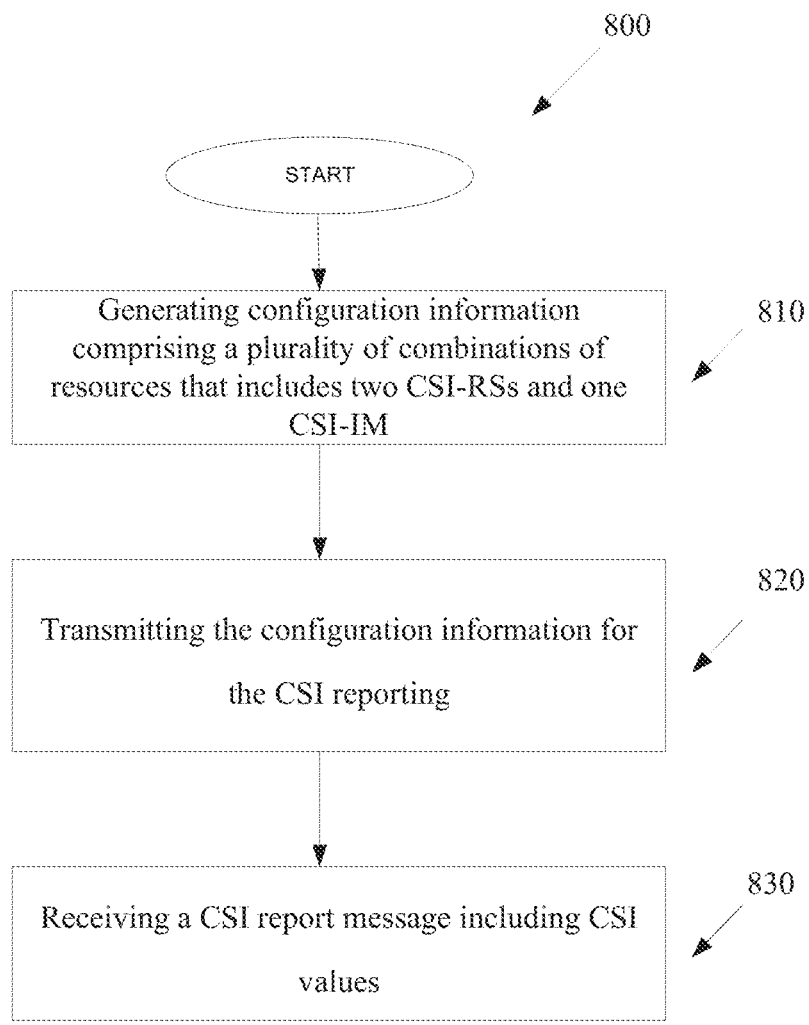
FIG. 8 illustrates a method of base station (BS) for coordinate multi-point transmission according to embodiments of the present disclosure.

FIG. 8 illustrates a method of base station (BS) for coordinate multi-point transmission according to embodiments of the present disclosure. The embodiment of the method of the BS illustrated in FIG. 8 800 is for illustration only, and the method of the BS 800 of FIG. 8 800 could have the same or similar configuration. However, FIG. 8 800 does not limit the scope of this disclosure to any particular implementation of the method of the BS).

The method of the BS as illustrated in FIG. 8 starts at step 810. At step 810, the BS (e.g., 102 and 103 as illustrated in FIG. 1) generates configuration information comprising a plurality of combinations of resources that includes two channel state information-reference signals (CSI-RSs) and one channel state information-interference measurement (CSI-IM). In such instance, the two CSI-RSs include CSI-RS1 and CSI-RS2. In some embodiments, the plurality of combinations of resources comprises at least one of a set of the CSI-RS1 and the CSI-IM, a set of the CSI-RS2 and the CSI-IM, or a set of the CSI-RS1, the CSI-RS2, and the CSI-IM.

Subsequently, the BS, at step 820, transmits the configuration information for the CSI reporting to a user equipment (UE). Finally, the BS, at step 830, receives a CSI report message including CSI values. In such instance, the CSI values are derived from the plurality of combinations of resources. In some embodiments, the BS receives the CSI report message including one CSI value. In such instance, the one CSI value among the CSI values is derived from the plurality of combinations of resources. In some embodiments, the configuration information is configured by at least one of a radio resource control signaling (RRC), a medium access control-control element (MAC-CE), or downlink control information (DCI) received from the BS. In some embodiments, the BS receive the CSI report message including the CSI values comprising co-phase information, the CSI values being derived based on a set of the CSI-RS1, the CSI-RS2, and the CSI-IM, and a coherent transmission if the coherent transmission is indicated. In such instance, the CSI values do not include the co-phase information if the coherent transmission is not indicated. In some embodiments, the BS receives the CSI report message including the CSI values derived from the plurality of combinations of resources comprising one CSI-RS and two CSI-IMs that include CSI-IM1 and CSI-IM2. In such instance, the plurality of combinations of resources includes at least one of a set of the CSI-RS and the CSI-IM1, a set of the CSI-RS and the CSI-IM2, or a set of the CSI-RS, the CSI-IM1, and the CSI-IM2.

Figure 9:
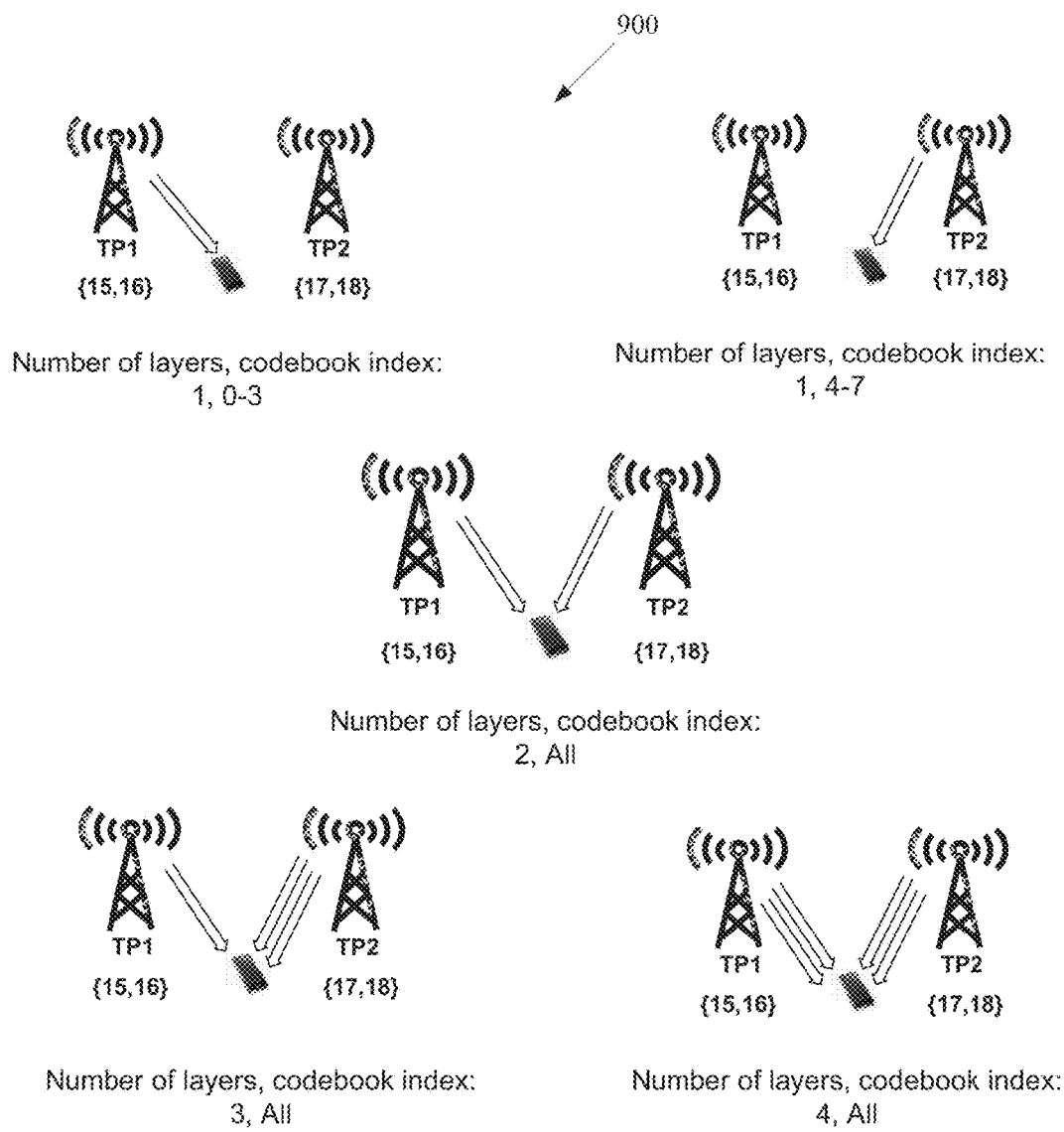
FIG. 9 illustrates various network transmission configurations according to embodiments of the present disclosure.

FIG. 9 illustrates various network transmission configurations according to embodiments of the present disclosure. The embodiment of the various network transmission configurations illustrated in FIG. 9 900 is for illustration only, and the various network transmission configurations of FIG. 9 900 could have the same or similar configuration. However, FIG. 9 900 does not limit the scope of this disclosure to any particular implementation of the method of the BS).

For the network to apply the NC-JT operation, for CSI reporting based on 4-port CSI-RS, a UE can be indicated to use an alternative 4-Tx codebook to be able to report CSI based on various network transmission options as illustrated in FIG. 9. As shown in FIG. 9, it is assumed that CSI-RS ports {15, 16} are transmitted from TP1 and CSI-RS ports {17, 18} are transmitted from TP2. For rank 1, the UE measures CSI based on either of the assumptions: only TP1 transmits a single layer, or only TP2 transmits a single layer. Two different groups of codebook index are assigned for the two different assumptions. For rank 2, the UE measures CSI based on an assumption that both TP1 and TP2 transmit a single layer. For rank 3, the UE measures CSI based on an assumption that TP1 transmits a single layer corresponding to CW0 and TP2 transmits two layers corresponding to CW1 of a PDSCH. For rank 4, the UE measures CSI based on an assumption that both TP1 and TP2 transmit two layers.

An example of the alternative 4-Tx codebook constructed according to FIG. 9 is shown in TABLE 16. The design principles for the 4-Tx codebook in TABLE 16 are as in the following. In one example, the scheduled PDSCH can be transmitted by up to two TRPs each of which is equipped with 2-Tx ports. In another example, it is a block diagonal codebook, where the first two rows correspond the precoders applied to a first TP, and the second two rows correspond to the precoders applied to a second TP. In yet another example, for rank 1 (i.e., 1 layer case), either only the first TP or the second TP transmits the PDSCH. In yet another example, from rank 2 or above, both TPs transmit the PDSCH. In case of rank 2, both TP1 and TP2 transmit a single layer. In such example, in case of rank 3, TP1 and TP2 respectively transmit a single and two layers. In such example, in case of rank 4, both TP1 and TP2 transmit two layers. In such example, the layer assignment is performed according to the MIMO codeword-to-layer mapping. In yet another example, the total number of PMI bits to feedback is up to 4 bits: for rank 1 and rank 3, the number of bits is 3 bits; for rank 2, the number of bits is 4 bits; and finally for rank 4, the number of bits is 2 bits.

TABLE 16

| | 4-Tx codebook | | | |
|---|---|---|---|---|
| Codebook index | Number of layers $\upsilon$ | | | |
| | 1 | 2 | 3 | 4 |
| 0 | $\frac{1}{\sqrt{2}}\begin{bmatrix}1\\1\\0\\0\end{bmatrix}$ | $\frac{1}{2}\begin{bmatrix}1&0\\1&0\\0&1\\0&1\end{bmatrix}$ | $\frac{1}{2\sqrt{2}}\begin{bmatrix}1&0&0\\1&0&0\\0&1&1\\0&1&-1\end{bmatrix}$ | $\frac{1}{4}\begin{bmatrix}1&1&0&0\\1&-1&0&0\\0&0&1&1\\0&0&1&-1\end{bmatrix}$ |
| 1 | $\frac{1}{\sqrt{2}}\begin{bmatrix}1\\-1\\0\\0\end{bmatrix}$ | $\frac{1}{2}\begin{bmatrix}1&0\\1&0\\0&1\\0&-1\end{bmatrix}$ | $\frac{1}{2\sqrt{2}}\begin{bmatrix}1&0&0\\-1&0&0\\0&1&1\\0&1&-1\end{bmatrix}$ | $\frac{1}{4}\begin{bmatrix}1&1&0&0\\1&-1&0&0\\0&0&1&1\\0&0&j&-j\end{bmatrix}$ |
| 2 | $\frac{1}{\sqrt{2}}\begin{bmatrix}1\\j\\0\\0\end{bmatrix}$ | $\frac{1}{2}\begin{bmatrix}1&0\\1&0\\0&1\\0&j\end{bmatrix}$ | $\frac{1}{2\sqrt{2}}\begin{bmatrix}1&0&0\\j&0&0\\0&1&1\\0&1&-1\end{bmatrix}$ | $\frac{1}{4}\begin{bmatrix}1&1&0&0\\j&-j&0&0\\0&0&1&1\\0&0&1&-1\end{bmatrix}$ |
| 3 | $\frac{1}{\sqrt{2}}\begin{bmatrix}1\\-j\\0\\0\end{bmatrix}$ | $\frac{1}{2}\begin{bmatrix}1&0\\1&0\\0&1\\0&-j\end{bmatrix}$ | $\frac{1}{2\sqrt{2}}\begin{bmatrix}1&0&0\\-j&0&0\\0&1&1\\0&1&-1\end{bmatrix}$ | $\frac{1}{4}\begin{bmatrix}1&1&0&0\\j&-j&0&0\\0&0&1&1\\0&0&j&-j\end{bmatrix}$ |
| 4 | $\frac{1}{\sqrt{2}}\begin{bmatrix}0\\0\\1\\1\end{bmatrix}$ | $\frac{1}{2}\begin{bmatrix}1&0\\-1&0\\0&1\\0&1\end{bmatrix}$ | $\frac{1}{2\sqrt{2}}\begin{bmatrix}1&0&0\\1&0&0\\0&1&1\\0&j&-j\end{bmatrix}$ | — |
| 5 | $\frac{1}{\sqrt{2}}\begin{bmatrix}0\\0\\1\\-1\end{bmatrix}$ | $\frac{1}{2}\begin{bmatrix}1&0\\-1&0\\0&1\\0&-1\end{bmatrix}$ | $\frac{1}{2\sqrt{2}}\begin{bmatrix}1&0&0\\-1&0&0\\0&1&1\\0&j&-j\end{bmatrix}$ | — |
| 6 | $\frac{1}{\sqrt{2}}\begin{bmatrix}0\\0\\1\\j\end{bmatrix}$ | $\frac{1}{2}\begin{bmatrix}1&0\\-1&0\\0&1\\0&j\end{bmatrix}$ | $\frac{1}{2\sqrt{2}}\begin{bmatrix}1&0&0\\j&0&0\\0&1&1\\0&j&-j\end{bmatrix}$ | — |
| 7 | $\frac{1}{\sqrt{2}}\begin{bmatrix}0\\0\\1\\-j\end{bmatrix}$ | $\frac{1}{2}\begin{bmatrix}1&0\\-1&0\\0&1\\0&-j\end{bmatrix}$ | $\frac{1}{2\sqrt{2}}\begin{bmatrix}1&0&0\\-j&0&0\\0&1&1\\0&j&-j\end{bmatrix}$ | — |
| 8 | — | $\frac{1}{2}\begin{bmatrix}1&0\\j&0\\0&1\\0&1\end{bmatrix}$ | — | — |
| 9 | — | $\frac{1}{2}\begin{bmatrix}1&0\\j&0\\0&1\\0&-1\end{bmatrix}$ | — | — |
| 10 | — | $\frac{1}{2}\begin{bmatrix}1&0\\j&0\\0&1\\0&j\end{bmatrix}$ | — | — |

TABLE 16-continued

4-Tx codebook

| Codebook index | Number of layers υ | | | |
|---|---|---|---|---|
| | 1 | 2 | 3 | 4 |
| 11 | — | $\frac{1}{2}\begin{bmatrix} 1 & 0 \\ j & 0 \\ 0 & 1 \\ 0 & -j \end{bmatrix}$ | — | — |
| 12 | — | $\frac{1}{2}\begin{bmatrix} 1 & 0 \\ -j & 0 \\ 0 & 1 \\ 0 & 1 \end{bmatrix}$ | — | — |
| 13 | — | $\frac{1}{2}\begin{bmatrix} 1 & 0 \\ -j & 0 \\ 0 & 1 \\ 0 & -1 \end{bmatrix}$ | — | — |
| 14 | — | $\frac{1}{2}\begin{bmatrix} 1 & 0 \\ -j & 0 \\ 0 & 1 \\ 0 & j \end{bmatrix}$ | — | — |
| 15 | — | $\frac{1}{2}\begin{bmatrix} 1 & 0 \\ -j & 0 \\ 0 & 1 \\ 0 & -j \end{bmatrix}$ | — | — |

Figure 10:
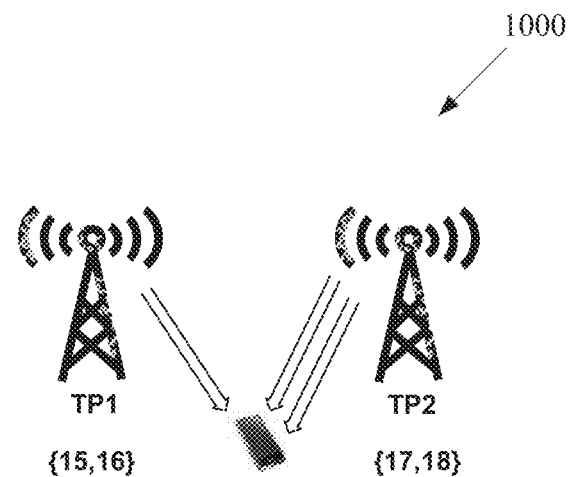
FIG. 10 illustrates Rank-3 transmissions assumption according to embodiments of the present disclosure.
Figure 10:
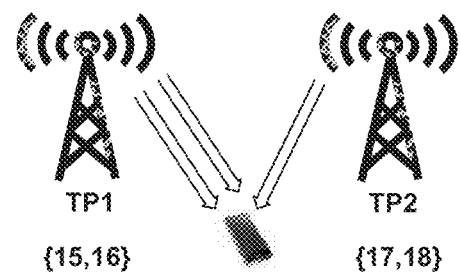

FIG. 10 illustrates Rank-3 transmissions assumption according to embodiments of the present disclosure. The embodiment of the Rank-3 transmissions assumption illustrated in FIG. 10 1000 is for illustration only, and the Rank-3 transmissions assumption of FIG. 10 1000 could have the same or similar configuration. However, FIG. 10 1000 does not limit the scope of this disclosure to any particular implementation of the method of the BS).

The design according to FIG. 9 and TABLE 16 has one drawback, which is related to rank-3 PMI reporting as illustrated in FIG. 9. A UE can report rank-3 CSI, based on a single assumption of TP1 transmitting a single layer and TP2 transmitting two layers only. The rank-3 CSI constructed according to TABLE 16 cannot be used for the other rank-3 construction of TP1 transmitting two layers and TP2 transmitting one layer. This is illustrated in FIG. 10.

In some embodiments to resolve the aforementioned drawback, the UE reports an additional one-bit information in addition to the 3-bit PMI when RI=3 is reported. The one-bit information indicates information of how the CSI-RS antenna ports (or resources) are ordered when the CSI is derived. The one-bit information comprises a "zero" state and a "one" state. When the indicated one-bit information corresponds to a first state, the UE assumes that the CSI-RS ports are ordered in a way of 15, 16, 17, and 18 or CSI derivation; when the indicated one-bit information corresponds to a second state, the UE assumes that the CSI-RS ports are ordered in a way of 17, 18, 15, and 16 for CSI derivation.

In some embodiments, when two two-port CSI-RS resources are configured (e.g., when TM10 is configured), the first state corresponds to the case where the two CSI-RS resources are aggregated in the order of the first and the second; and the second state corresponds to the case where the two CSI-RS resources are aggregated in the order of the second and the first. In such embodiments, the UE may assume that the CSI-RS port numbers are ordered in a sequential manner, e.g., 15, 16, 17, and 18. In such embodiments, the total number of bits reported as PMI when RI=3 is reported is 3+1=4 bits. The additional one-bit information may be configured to be reported for a full set of RI values. Alternatively, the additional one-bit information may be configured to be reported for a subset of RI values, e.g., {3}, or {1,3}, or {1,3,4}, or every odd number of RIs (because of the numbers of layers transmitted by the TRPs are different).

In general, information to indicate a preferred ordering of the CSI-RS resources used for generating an aggregation of the CSI-RS resources to be used for deriving the CSI can be configured to be reported when a certain set of RI values are reported. The information bit size can be larger than 1 bit and dependent upon the number of permutations of the configured CSI-RS resources. For example, when 3 CSI-RS resources are configured, the number of permutations becomes 3 factorial=6; and hence the information bit size becomes 3 bits.

For supporting TM9, the 4-port CSI-RS can be configured by means of a single CSI-RS resource, wherein the UE may assume that the first two ports, i.e., 15 and 16 are QCL'ed with each other; and the second two ports, i.e., 17 and 18 are QCL'ed with each other; but the UE may not assume that a port selected from {15, 16} and a port selected from {17, 18} are QCL'ed. The UE may be additionally informed information about CRS to QCL with the group of CSI-RS, for each of CSI-RS ports {15,16} and CSI-RS ports {17,18}.

When the UE is configured to report CSI according to an alternative 4-Tx designed for NC-JT (e.g., TABLE 16) and/or 4-port CSI-RS is configured and/or TM9 is configured, the UE may be configured to receive one bit information in the DCI (e.g., DCI format 2C) to indicate a QCL state. The one-bit information comprises a "zero" state and a "one" state. The one bit state indicates: (1) when rank 1, the one bit state indicates which of a first group of CSI-RS ports (i.e., {15,16}) and a second group of CSI-RS ports (i.e., {17,18}) to assume for the QCL with the DMRS; and (2) when rank 2, the one bit state indicates whether the first group of CSI-RS ports is QCLed with CW0 or CW1; the second group of CSI-RS ports is QCLed with the other CW, which is not-QCLed with the first group.

When the PDSCH scheduled by the DCI is rank-1 (with a single transmission layer), and when the information bit state is a first one, the UE may assume that the PDSCH DMRS is QCL'ed with CSI-RS ports {15, 16} in the delay parameters. On the other hand, when the PDSCH scheduled by the DCI is rank-1 (with a single transmission layer), and when the information bit state is a second one, the UE may assume that the PDSCH DMRS is QCL'ed with CSI-RS ports {17,18} in the delay parameters.

When the PDSCH scheduled by the DCI is rank-2, 3 or 4 (with 2, 3, 4 transmission layers), when the information bit state is a first one, the UE may assume that the DMRS ports corresponding to CW0 is QCL'ed with CSI-RS ports {15, 16} and the DMRS ports corresponding to CW1 is QCL'ed with CSI-RS ports {17, 18}. When the information bit state is a second one, the UE may assume that the DMRS ports corresponding to CW0 is QCL'ed with CSI-RS ports {17, 18} and the DMRS ports corresponding to CW1 is QCL'ed with CSI-RS ports {15, 16}.

For rank 2, the DMRS ports corresponding to CW0 and CW1 are respectively {7} and {8}. For rank 3, the DMRS ports corresponding to CW0 and CW1 are respectively {7} and {9, 10} in one alternative; and {7}, {8, 9} in another alternative. For rank 4, the DMRS ports corresponding to CW0 and CW1 are respectively {7, 8} and {9, 10}.

The one bit information may be explicitly indicated by an additional one bit. Alternatively, the one bit information may be indicated by an NDI of a disabled TB (in this case, for rank-2 and above the network cannot swap the codeword assignment for the two TPs). For supporting the QCL, an additional QCL type seems to be necessary.

In some embodiments, a new QCL type with new QCL assumption for DM-RS antenna port groups is used. In such embodiments, a new QCL type is configured by RRC and a new QCL type has the same QCL assumption as QCL type B except for DM-RS antenna ports. In such instance, regardless of the initial PDSCH transmission or retransmission: a UE may assume that all DM-RS antenna ports associated with each CW are co-located wrt to all parameters; a UE may not assume that DM-RS antenna ports associated with different CWs are co-located wrt to all parameters, unless indicated; a UE is informed regarding QCL assumptions between DM-RS antenna ports and CSI-RS resource; and dynamic switching between NC-JT and single point transmission is supported.

In some embodiments, a new QCL type configuration is used. In such embodiments, the existing PDSCH-RE-MappingQCL is extended by allowing configuration of the $2^{nd}$ set of following parameters: CRS port number; CRS shift; MBSFN configuration; ID of ZP CSI-RS ID; and ID NZP CSI-RS for QCL. In such embodiments, a UE may assume the same PDSCH start for the $1^{st}$ and $2^{nd}$ sets The QCL type is referred to as "QCL type C." Then for TM9, a UE can be configured with "QCL type D," which may be defined as in the following.

In some embodiments, a new QCL type with new QCL assumption for DM-RS antenna port groups is used. In such embodiments, a new QCL type is configured by RRC and a new QCL type has the same QCL assumption as QCL type B except for DM-RS antenna ports. In such instance, regardless of the initial PDSCH transmission or retransmission: a UE may assume that all DM-RS antenna ports associated with each CW are co-located wrt to all parameters; a UE may not assume that DM-RS antenna ports associated with different CWs are co-located wrt to all parameters, unless indicated; a UE is informed regarding QCL assumptions between DM-RS antenna ports and CSI-RS ports of the configured CSI-RS resource; and dynamic switching between NC-JT and single point transmission is supported.

In some embodiments, a new QCL type configuration is used. In such embodiments, for rank-1, a 1-bit information is indicated to the UE for the DM-RS and CSI-RS port QCL. In such embodiments, for rank-2 and above, DMRS ports corresponding to CW0 is CSI-RS ports QCL'ed with {15, 16}, and DMRS ports corresponding to CW1 is QCL'ed with CSI-RS ports {17, 18}.

The QCL type D may be applicable only when the UE is configured with an alternative 4-Tx codebook designed for NC-JT (e.g., as shown in TABLE 16). For supporting TM10, the 4-port CSI-RS can be configured by means of an aggregation of two separately configured CSI-RS resources in a CSI process, where each CSI-RS resource comprises two CSI-RS ports.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for channel state information (CSI) reporting in a wireless communication system, the UE comprising:
  a transceiver configured to receive, from a base station (BS), configuration information for the CSI reporting;
  at least one processor configured to:
    configure a plurality of combinations of resources out of a pool of resources, wherein the pool of resources includes two channel state information-reference signals (CSI-RSs) and one channel state information-interference measurement (CSI-IM) based on the configuration information, wherein the two CSI-RSs include CSI-RS1 and CSI-RS2;
    determine, based on a configuration value included in the configuration information, one of the plurality of combinations of resources to use to derive a CSI value for the CSI reporting;
    if the configuration value is a first value, derive the CSI value based on the CSI-RS1 and the CSI-IM;
    if the configuration value is a second value, derive the CSI value based on the CSI-RS2 and the CSI-IM; and if the configuration value is a third value, derive the CSI value based on the CSI-RS1, the CSI-RS2, and the CSI-IM, wherein the transceiver is further configured to transmit, to the BS, a CSI report message including the derived CSI value.

2. The UE of claim 1, wherein:

the plurality of combinations of resources comprises a set of the CSI-RS1 and the CSI-IM, a set of the CSI-RS2 and the CSI-IM, and a set of the CSI-RS1, the CSI-RS2, and the CSI-IM, and the CSI report message comprises CSI values, including the derived CSI value, derived from the plurality of combinations of resources, respectively.

3. The UE of claim 1, wherein the configuration information is configured by at least one of a radio resource control signaling (RRC), a medium access control-control element (MAC-CE), or downlink control information (DCI) received from the BS.

4. The UE of claim 1, wherein:

the at least one processor is further configured to:
determine a set of the CSI-RS1, the CSI-RS2, and the CSI-IM based on the configuration information;
determine whether a coherent transmission is indicated; and
derive, if the coherent transmission is indicated, the CSI value based on the set of the CSI-RS1, the CSI-RS2, and the CSI-IM, and the coherent transmission; and the transceiver is further configured to transmit the CSI report message including the CSI value and co-phase information, wherein the CSI report message does not include the co-phase information if the coherent transmission is not indicated.

5. The UE of claim 1, wherein:

the at least one processor is further configured to:
configure, based on the configuration information, the plurality of combinations of resources including one CSI-RS and two CSI-IMs that include CSI-IM1 and CSI-IM2, wherein the plurality of combinations of resources includes at least one of a set of the CSI-RS and the CSI-IM1, a set of the CSI-RS and the CSI-IM2, or a set of the CSI-RS, the CSI-IM1, and the CSI-IM2; and
derive CSI values from the plurality of combinations of resources, respectively, to generate the CSI report message; and the transceiver is further configured to transmit the CSI report message including the CSI values.

6. The UE of claim 1, wherein:

the at least one processor is further configured to:
determine the plurality of combinations of resources based on information that is configured in the UE; and
derive CSI values, including the derived CSI value, from the plurality of combinations of resources, respectively, to generate the CSI report message; and the transceiver is further configured to transmit the CSI report message including the CSI values.

7. A base station (BS) for channel state information (CSI) reporting in a wireless communication system, the BS comprising:

at least one processor configured to generate configuration information including a configuration value indicating one of a plurality of combinations of resources for a user equipment (UE) to use to derive a CSI value for the CSI reporting, the plurality of combinations of resources configured from of a pool of resources, wherein:

the pool of resources includes two channel state information-reference signals (CSI-RS s) and one channel state information-interference measurement (CSI-IM), the two CSI-RSs include CSI-RS1 and CSI-RS2, the configuration value being a first value indicates to derive the CSI value based on the CSI-RS1 and the CSI-IM, the configuration value being a second value indicates to derive the CSI value based on the CSI-RS2 and the CSI-IM, and the configuration value being a third value indicates to derive the CSI value based on the CSI-RS1, the CSI-RS2, and the CSI-IM; and a transceiver configured to:
transmit, to the UE, the configuration information for the CSI reporting; and
receive, from the UE, a CSI report message including a CSI value, wherein the CSI value is derived from the one of the plurality of combinations of resources indicated by the configuration value.

8. The BS of claim 7, wherein:

the plurality of combinations of resources comprises a set of the CSI-RS1 and the CSI-IM, a set of the CSI-RS2 and the CSI-IM, and a set of the CSI-RS1, the CSI-RS2, and the CSI-IM, and the CSI report message comprises CSI values, including the derived CSI value, derived from the plurality of combinations of resources, respectively.

9. The BS of claim 7, wherein the configuration information is configured by at least one of a radio resource control signaling (RRC), a medium access control-control element (MAC-CE), or downlink control information (DCI) received from the BS.

10. The BS of claim 7, wherein the transceiver is further configured to receive the CSI report message including the CSI value and co-phase information, the CSI value derived based on a set of the CSI-RS1, the CSI-RS2, and the CSI-IM, and a coherent transmission if the coherent transmission is indicated, and wherein the CSI report message does not include the co-phase information if the coherent transmission is not indicated.

11. The BS of claim 7, wherein the transceiver is further configured to receive the CSI report message including CSI values, the CSI values derived from the plurality of combinations of resources comprising one CSI-RS and two CSI-IMs that include CSI-IM1 and CSI-IM2, and wherein the plurality of combinations of resources includes at least one of a set of the CSI-RS and the CSI-IM1, a set of the CSI-RS and the CSI-IM2, or a set of the CSI-RS, the CSI-IM1, and the CSI-IM2.

12. A method of user equipment (UE) for channel state information (CSI) reporting in a wireless communication system, the method comprising:

receiving, from a base station (BS), configuration information for the CSI reporting;

configuring a plurality of combinations of resources out of a pool of resources, wherein the pool of resources includes two channel state information-reference signals (CSI-RSs) and one channel state information-interference measurement (CSI-IM) based on the configuration information, wherein the two CSI-RSs include CSI-RS1 and CSI-RS2;

determining, based on a configuration value included in the configuration information, one of the plurality of combinations of resources to use to derive a CSI value for the CSI reporting;

if the configuration value is a first value, deriving the CSI value based on the CSI-RS1 and the CSI-IM;

if the configuration value is a second value, deriving the CSI value based on the CSI-RS2 and the CSI-IM;

if the configuration value is a third value, deriving the CSI value based on the CSI-RS1, the CSI-RS2, and the CSI-IM; and transmitting, to the BS, a CSI report message including the derived CSI value.

13. The method of claim 12, wherein:

the plurality of combinations of resources comprises a set of the CSI-RS1 and the CSI-IM, a set of the CSI-RS2 and the CSI-IM, and a set of the CSI-RS1, the CSI-RS2, and the CSI-IM, and the CSI report message comprises CSI values, including the derived CSI value, derived from the plurality of combinations of resources, respectively.

14. The method of claim 12, wherein the configuration information is configured by at least one of a radio resource control signaling (RRC), a medium access control-control element (MAC-CE), or downlink control information (DCI) received from the BS.

15. The method of claim 12, further comprising:

determining a set of the CSI-RS1, the CSI-RS2, and the CSI-IM based on the configuration information;

determining whether a coherent transmission is indicated;

deriving, if the coherent transmission is indicated, the CSI value based on the set of the CSI-RS1, the CSI-RS2, and the CSI-IM, and the coherent transmission; and transmitting the CSI report message including the CSI value and co-phase information, wherein the CSI report message does not include the co-phase information if the coherent transmission is not indicated.

16. The method of claim 12, further comprising:

configuring, based on the configuration information, the plurality of combinations of resources including one CSI-RS and two CSI-IMs that include CSI-IM1 and CSI-IM2, wherein the plurality of combinations of resources includes at least one of a set of the CSI-RS and the CSI-IM1, a set of the CSI-RS and the CSI-IM2, or a set of the CSI-RS, the CSI-IM1, and the CSI-IM2;

deriving CSI values from the plurality of combinations of resources, respectively, to generate the CSI report message; and transmitting the CSI report message including the CSI values.

17. The method of claim 12, further comprising:

determining the plurality of combinations of resources based on information that is configured in the UE;

deriving CSI values, including the derived CSI value, from the plurality of combinations of resources, respectively, to generate the CSI report message; and transmitting the CSI report message including the CSI values.

* * * * *